United States Patent [19]

Lee

[11] Patent Number: 5,479,624
[45] Date of Patent: Dec. 26, 1995

[54] HIGH-PERFORMANCE INTERLEAVED MEMORY SYSTEM COMPRISING A PRIME NUMBER OF MEMORY MODULES

[75] Inventor: De-Lei Lee, Thornhill, Canada

[73] Assignee: Lee Research, Inc., Ontario, Canada

[21] Appl. No.: 960,853

[22] Filed: Oct. 14, 1992

[51] Int. Cl.$^6$ .................................................. G06F 12/00
[52] U.S. Cl. ..................... 395/401; 395/427; 364/DIG. 1
[58] Field of Search .................................... 395/400, 425

[56] References Cited

U.S. PATENT DOCUMENTS

| | | | |
|---|---|---|---|
| 4,051,551 | 9/1977 | Lawrie et al. | 395/425 |
| 4,101,960 | 7/1978 | Stokes et al. | 395/800 |
| 4,334,285 | 6/1982 | Kawakita et al. | 364/761 |
| 4,400,768 | 8/1983 | Tomlinson | 395/400 X |
| 4,918,600 | 4/1990 | Harper, III et al. | 395/425 |
| 5,111,389 | 5/1992 | McAuliffe et al. | 395/400 X |
| 5,123,095 | 6/1992 | Papadopoulos et al. | 395/375 |
| 5,247,645 | 9/1993 | Mirza et al. | 395/425 |
| 5,276,826 | 1/1994 | Rau et al. | 395/400 |
| 5,323,489 | 6/1994 | Bird | 395/425 |

OTHER PUBLICATIONS

"Address Mapping For A Memory Systems with A Prime Number of Banks," IBM Technical Disclosure Bulletin, vol. 27, No. 11 Apr. 1985, pp. 6369–6372.

Raghavan et al., "On Randomly Interleaved Memories," Proceedings of Supercomputing 1990, Nov. 1990, pp. 49–58.

Yuhang, "Memory Performance and Multi–Level Algorithm of Address Transformation," Chinese Journal of Computers, vol. 6, No. 3, 1983, pp. 168–177.

Yun–Kuei et al. "An Analysis of a Memory System For Conflict–Free Access," Proc. of 1981 Int'l Conference on Parallel Processing, Aug. 1981, pp. 318–324.

Knuth, D. E., *Seminumerical Algorithms*, Section 4.3.2 "Modular Arithmetic", pp. 268–276, Addison–Wesley, (1968).

Kuck, David J., et al. "*The Burroughs Scientific Processor (BSP)*", IEEE Transactions on Computers, vol. C–31, No. 5, May 1992, pp. 363–376.

Cheung, Tony, et al. "*A simulation Study of the CRAY X–MP Memory System*", IEEE Transactions on Computers, vol. C–35, No. 7, Jul. 1986, pp. 613–622.

Wallace, C. S., "*A Suggestion for a Fast Multiplier*" IEE Transactions on Computers, Feb. 1964, pp. 14–17.

*Primary Examiner*—Michael A. Whitfield
*Attorney, Agent, or Firm*—Staas & Halsey

[57] ABSTRACT

A method for implementation of muti-port interleaved memory systems comprising any prime number P of memory modules each of which contains a power of two memory banks. Each memory bank comprises a power of two memory locations. In this method, sequential addresses are mapped into sequential memory modules, and the addresses mapped into a given module are mapped into distinct memory locations within the module without explicit and implicit operations of division by the prime number P. The method embodies families of functions any one of which can be used for the bijective mapping of addresses into memory locations within a memory module. Furthermore, any of the functions is computable in O(1) gate delays employing O($\log_2$P) logic gates. A multi-port interleaved memory system with P memory modules can serve multiple requests for vectors of data, where each memory port is used to serve a request for a vector of data. Disclosed is also a method for generating memory addresses for words of a vector in optimized address sequence of the α-type, where α is a fixed integer in the range $1 \leq \alpha \leq P-1$. Serving a request for a vector of data at each memory port by accessing words of the vector in optimized sequence of the α-type minimizes memory access conflicts among the concurrent access of multiple vectors when the value of α is fixed at the same value for all memory ports.

12 Claims, 6 Drawing Sheets

| TIME | 0 | 1 | 2 | 3 | 4 | ... | P |
|------|---|---|---|---|---|-----|---|
| STAGE 1 | X | | | | | ... | |
| STAGE 2 | | X | X | | | ... | |
| STAGE 3 | | X | X | X | X | ... | X |

FIG.6.

| TIME | 0 | 1 | 2 | 3 | 4 | ... | d | d+1 | d+2 | d+3 | ... | VL |
|------|---|---|---|---|---|-----|---|-----|-----|-----|-----|----|
| STAGE 1 | X | | | | | ... | X | | | | ... | |
| STAGE 2 | | X | X | | | ... | | X | X | | ... | |
| STAGE 3 | | X | X | X | X | ... | X | X | X | X | ... | X |

FIG.7.

HIGH-PERFORMANCE INTERLEAVED MEMORY SYSTEM COMPRISING A PRIME NUMBER OF MEMORY MODULES

FIELD OF INVENTION

This invention relates in general to interleaved memory systems for computers, and, more particularly, to methods for the implementation of multi-port interleaved memory systems comprised of any prime number of memory modules wherein each memory module comprises $2^m$ memory banks wherein m is an integer $\geq 0$.

BACKGROUND OF THE INVENTION

Memory interleaving and multiple memory access ports are the key to high memory bandwidth (i.e., the number of words that can be accessed per second) in vector processor systems. Memory interleaving is to partition a memory system into independent memory modules such that sequential memory addresses fall into sequential memory modules. The bandwidth of an interleaved memory system can be increased over that of a single memory module through utilization of overlapped access to multiple memory modules.

A vector processor system may have one or more processors operating concurrently, each processor may have one or more memory ports of a multi-port interleaved memory system and can request a vector of data via a memory port. Each processor in the system may include a local memory which serves as an intermediate high speed buffer so that both memory port and arithmetic pipeline can access data in the local memory without destructive interference.

Each memory port of a multi-port interleaved memory system serves a request for a vector of data by accessing elements (words) of the vector sequentially, one word at a time. A vector of data is typically specified by three parameters, the starting address SA, the stride S (address offset between successive elements of the vector) and the length VL for a vector of VL words with the address sequence <SA,SA+S, SA+2S, . . . ,SA+(VL−1)S>. When the memory system is accessed via multiple concurrently operating memory ports, each requesting access to a memory location every clock cycle, memory access conflicts may arise. Such access conflicts lead to a decrease in memory bandwidth.

Numerous commercial vector supercomputers employ variations of the multiple memory port interleaved memory design paradigm for example see Stone, H. S., "High-Performance Computer Architecture (Second Edition) ", Addison Wesley Publ. Co., (1990) , and Hennessey J. L. and Patterson, D. A., "Computer Architecture: A Quantified Approach:", Morgan Kaufman Publ. Inc. (1990).

As used herein, an N-way interleaved memory system is said to be comprised of N memory modules such that each memory module comprises $2^m$ memory banks wherein m is any integer. A memory module comprising one memory bank, i.e., when m=0, will be called a single bank memory module. The single memory bank contains a fixed number of memory cells each of which contains a single word of data, and only one word can be accessed at a time. Please see the section entitled SYMBOLS AND NOTATION CONVENTIONS, hereinafter for a full discussion of the symbols and conventions used herein.

For a typical N-way interleaved memory system, it is known that N successive memory addresses with stride S are directed to N/GCD(N,S) memory modules wherein GCD(N, S) denotes the greatest common divisor of the integers N and S. When N and S are relatively prime (i.e., GCD(N,S)=1) the N successive memory accesses are directed to N distinct memory modules of the memory system, see stone. Hence, the maximum number of usable memory modules is N/GCD(N,S) when serving a vector with stride S in an N-way interleaved memory system. If N and S are relatively prime, then the maximum number of usable memory modules is N, see for example Kogge, P. M., "The Architecture of Pipelined Computers", Hemisphere Publishing Corporation (1981). Maximizing the number of usable memory modules in an N-way interleaved memory system for each vector access helps reduce memory access conflicts among concurrent access of multiple vectors to memory, and, therefore, sustain high memory bandwidth. In any given problem many values of stride are employed to access different vectors. Stride is, however, application dependent.

Commercial N-way interleaved memory systems generally suffer unavoidable memory access conflicts as N is generally chosen to be a power of 2, that is, of the form $N=2^k$, where k is an integer This choice for the value of N is dictated by the structure of the two equations used to map any memory address A to location L in the memory module B. The two equations follow:

$$L = \lfloor A/N \rfloor \tag{1}$$

$$B = A \bmod N \tag{2}$$

Whenever $N=2^k$, the computation of equations (1) and (2) is greatly simplified and executed in O(1) gate delays (e.g. a constant number of gate delays), i.e., the division and mod N operations are reduced to trivial operations.

Any vector access with an odd value of stride (GCD(N, S)=1) maps to N consecutive addresses located in N distinct memory modules. However, when the stride is an even number, serious memory access conflicts can occur which dramatically degrades the performance of the N-way interleaved memory system, see Hennessey.

Although individual stride problems in a given application can be avoided by judicious and laborious program restructuring, the only way to sustain peak memory bandwidth in an N-way interleaved memory system for all values of the stride (i.e. for all applications) is to employ a prime number of memory modules. The number of usable memory modules is one when the stride is a multiple of the prime number which can be avoided by a single programming intervention.

Significant problems arise when N is a prime number. When N is prime, the computation of equations (1) and (2), which involves both explicit and implicit division operations by a prime number, requires not only an excessive amount of hardware but also multiple clock cycles. These consequences completely offset the performance advantages gained by the use of a prime number of memory modules. The formidable problems associated with the use of a prime number of memory modules in interleaved memories in vector processor systems have remained unresolved, heretofore.

An early attempt to use a prime number of memory modules in a memory system for application in a parallel array processor architecture was disclosed. in Lawrie et al., U.S. Pat. No. 4,051,551, hereinafter referred to as Lawrie and Vora. Lawrie and Vora disclose a parallel memory system comprised of N=17 single bank memory modules serving a fully parallel array of 16 processors performing the same instruction on different elements of a vector of length 16 (i.e., comprised of 16 words). The 17 memory modules of the memory system operate in lock-step to access a vector of 16 words in fully parallel. It must be emphasized that the architecture of this computer, the Burrough's Scientific Processor, is significantly different from pipelined vector computer architecture, see Kuck, D. E. and Stokes, R. A., "The Burroughs Scientific Processor (BSP):, IEEE Transactions on Computers, Vol.C-31, pp. 363–376 (May, (1982).

Lawrie and Vora were unsuccessful in solving the computational problems associated with division by a prime number. In order to compute equation (1), Lawrie and Vora arbitrarily replace N (the prime number) by the nearest number less than N which is expressible as a power of 2. In the case of N=17, N was replaced in the division operation by 16. This approach results in under-utilization of memory. The Lawrie and Vora approach in some cases results in up to 50% wastage of memory space.

It is a commonly held notion in the art that it is not possible for cost-effective implementation of prime-way interleaved memory systems in commercial high-performance computing systems, i.e., memory systems wherein the number of memory modules N is a prime number.

OVERVIEW OF THIS DISCLOSURE

The inventions disclosed herein have general applicability to various and diverse types of computer memory systems. In order to illustrate the full range of applicability and the various aspects of the inventions disclosed herein, a general framework defining multi-port interleaved memory systems for multiprocessor computer architectures is introduced. Within this framework the (N,K,M)-type memory system is defined. This notation denotes an interleaved memory system comprised of N memory modules each comprised of $2^m$ memory banks. The memory modules are organized into K sections such that each section has M section ports. The K×M section ports are connected by M (K ×K)-crossbar switches to provide a memory system with M×K memory ports.

The salient aspect of this disclosure is a general method for the implementation of multi-port N-way interleaved memory systems wherein the number of memory modules N can be any prime number P.

The invention provides a bijective mapping which maps all addresses into distinct locations of a memory system of the (N,K,M)-type. The method comprises a bijective mapping II which maps all addresses into distinct locations of the memory system and which is denoted by the equation:

$$\Pi:A \rightarrow (L,B,M,T)$$

such that every address is mapped onto a distinct location L, of memory bank B, in memory module M in section T.

The disclosure provides a method for the efficient computation of the location index L when the number of memory modules N is any prime number and assures 100% utilization of memory space. In particular, the method provides for the determination of the location index L which does not require division by the prime number P and which can be computed in O(1) gate delays with O($\log_2 P$) logic gates.

An (N,K,M)-type memory system in which the number of interleaved memory modules is a prime number P is denoted as a (P,K,M)-type memory system. The invention disclosed herein is combined with known methods for the determination of the memory module index B. These known methods do not require explicit division by the prime number P, as set forth in Knuth, D. E., "Seminumerical Algorithms", Addison-Wesley (1968). These determinations can be achieved in O($\log_2 n$) gate delays wherein n is the number of bits of memory address.

In order to maintain clarity of exposition and to simplify the notational complexity of the mathematics the essential features of the method are described for mapping memory addresses into distinct locations of a memory system comprised of 1 section and of a prime number P of memory modules each of which contains only one memory bank.

For such a memory system, the method for mapping addresses into distinct locations of the memory system and for the computation of L for any prime number P of memory modules is presented in four steps during which special classes of prime numbers are considered. In particular, mapping methods and schemes for the computational of the location index L are disclosed for the cases when the prime P is a Mersenne number ($P=2^k-1$), a Fermat number ($P=2^k+1$), a General Mersenne number ($P=2^k-\Delta$) and a General Fermat number ($P=2^k+\Delta$) wherein k and $\Delta$ can be any integer. It should be noted that all integers, including all primes, are included in the union of the General Mersenne and General Fermat numbers. Accordingly, the methods described can be applied to all interleaved memory systems, both prime and otherwise, although the essential benefits accrue only for prime-way interleaved memory systems.

The indexing equations have been developed for a zero origin memory system in which the first memory module is numbered as zero and the first memory address is numbered as zero. The indexing equations may be readily modified to accommodate other than the zero origin convention.

The methods disclosed in this invention employ mappings for the location index which are shown to include a large family of functions which are algebraically equivalent to the specific disclosed equations.

The mapping methods and the computation of L are further generalized to a memory system comprised of P memory modules wherein each memory module is comprised of $2^m$ memory banks and where m is any integer greater than 0. The mapping methods disclosed ensure 100% utilization of memory space without contention and data corruption.

It is recognised that memory access conflicts may still occur in a multi-port memory system of the (P,K,M)-type when concurrent access of multiple vectors are requested by a computing system. Finally this invention addresses the issue of memory access conflict minimization in (P,K,M)-type memory systems.

The final section of this disclosure introduces the concept of optimized address sequence and presents a method for the efficient generation of memory addresses for words of a vector in optimized address sequence. Serving a request for a vector of data at each memory port by accessing elements of the vector in optimized address sequence significantly minimizes memory access conflicts among concurrent access of multiple vectors and, therefore, improves performance in any (P,K,M)-type interleaved memory system. The performance benefits obtained by use of optimized address sequence can be realized only in prime-way interleaved memory systems as the number of usable memory modules is always P, provided the value of vector strides is not a multiple of P.

The present invention can be applied, without restriction, to any computer architecture which employs multi-port interleaved memory systems. Such multi-port interleaved memory systems support both uniprocessor and multiprocessor architectures which may access multiple vectors concurrently at any given time.

SUMMARY OF THE INVENTION

According to one aspect of the present invention there is provided a method for implementing various types of interleaved memory systems comprising any prime number of memory modules, denoted as prime-way (P,K,M)-type interleaved memory systems, which are suitable for computing systems with uniprocessor and multiprocessor architectures.

According to another aspect of the present invention there is provided a method for mapping memory addresses without contention into distinct locations of various types of prime-way interleaved memory systems so that all memory locations are utilized and such that implicit and explicit division operations are avoided in computation of the location index L and such that the computation of the location index is accomplished in $O(1)$ gate delay with $O(\log_2 P)$ logic gates.

According to another aspect of the present invention there is provided a method for generating families of functions which are equivalent to the mappings disclosed herein for the determination of the location index L.

According to a further aspect of the present invention there is provided a method for mapping memory addresses without contention into distinct locations of prime-way interleaved memory systems in which each memory module comprises $2^m$ memory banks and each memory bank contains $2^b$ locations wherein m and b are integers.

It is yet another aspect of the present invention according to which an optimized address sequence for a vector is introduced and there is provided a method for each memory port to serve a request for a vector of data by accessing words of the vector in optimized address sequence for the minimization of memory access conflicts among concurrent access of multiple vectors requested by a computing system.

The various aspects of the present invention have application in computing systems which may require concurrent access of multiple vectors of data at any given time to memory.

BRIEF DESCRIPTION OF THE FIGURES

The following drawings are included to provide a clearer understanding of the present invention in its various aspects and to demonstrate how it can be carried into effect:

FIG. 6 depicts a reservation table for the pipeline of FIG. 5 to execute procedure 3.

FIG. 7 depicts a reservation table for the pipeline of FIG. 5 to execute procedure 4.

DETAILED DESCRIPTION OF THE PREFERRED EMBODIMENTS

Figure 1:
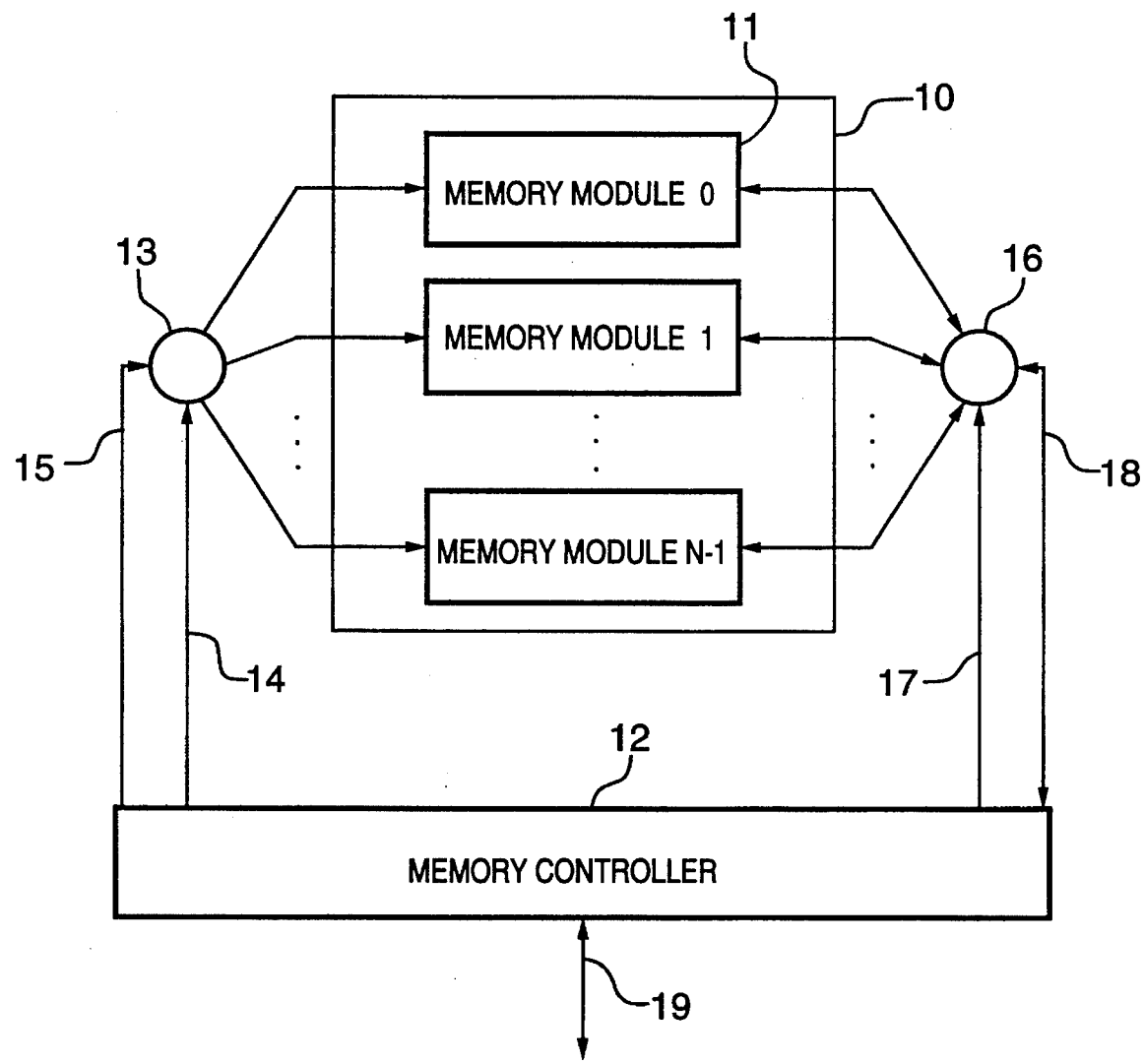
FIG. 1 depicts the organization of a typical single memory port N-way interleaved memory system comprised of a number N of memory modules according to the prior art.

FIG. 1 depicts, in schematic form, a typical N-way interleaved memory system with a single memory port.

The memory 10 is comprised of N independent memory modules 11 each of which comprises a single memory bank. In such memories the terms memory bank and memory module are often used interchangeably. A memory bank is comprised of a fixed number of memory locations only one of which can be accessed at any time. Each memory module includes its own address register (not shown) and data register (not shown). Two separate busses, the address bus 15 and the data bus 18 interpose the plurality of memory modules and the memory controller 12. The function of the address bus is to associate the memory controller 12 with a particular memory module 11 and thereby to permit the transfer of an address from the memory controller 12 to the memory module. The function of the data bus 18 is to associate the memory controller 12 with a particular memory module 11 to permit the transfer of data. The address register of a selected memory module is connected to the address bus via a switch 13 in accordance with the specific memory module index transmitted to the control line 14 by the memory controller 12. The data register of a selected memory module 11 is connected to the data bus 18 via a switch 16 in accordance with the specific memory module index transmitted to the control line 17 by the memory controller.

The memory system depicted in FIG. 1 has a single memory port 19. The memory controller accepts a request for accessing a vector of data via the memory port 19 and processes the request by accessing elements (words) of the vector one word at a time. To access a word, the memory controller determines whether the memory module containing the requested word is currently busy with a previous access. If not, the appropriate location index is loaded into the memory module's address register and the memory module access starts. If the memory module is busy, the new access requested is delayed for one clock cycle. In the next clock cycle the memory controller attempts to access the memory module again. While the memory module is accessing the appropriate location, the memory controller handles other words of the vector in a similar fashion.

When a memory module access is completed, the memory controller either starts a new access, if the previous access was a memory write operation, or, if the previous access was a memory read operation, routes the accessed word from the memory module to the data bus 18 before initiating a new access. The data bus 18 is connected to the requesting computing system via the memory port 19. The memory controller also includes various devices for generating the address and its corresponding memory module index and location index for each word of the vector.

An N-way interleaved memory system with a single memory port can serve only a single request for a vector of data at any given time. An N-way interleaved memory system with multiple memory ports can serve multiple requests for vectors of data at any given time, with each memory port services a single request for vector access.

Figure 2:
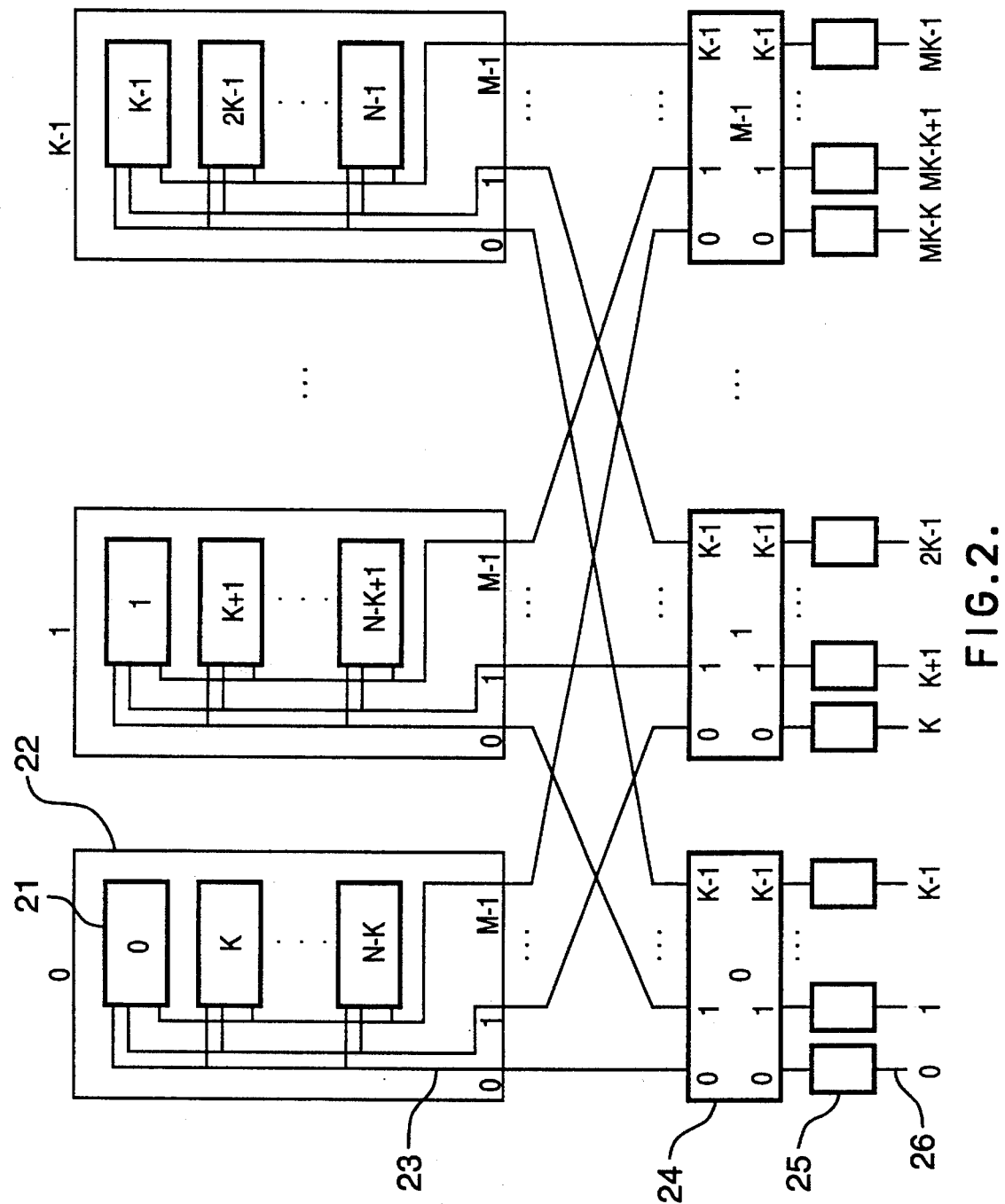
FIG. 2 depicts the organization of a multiple memory port N-way interleaved memory system in which the N memory modules are organized into K sections such that each section has M section ports and the memory system has K×M memory ports. Accordingly, this interleaved memory system is denoted as an (N,K,M)-type interleaved memory system.

A variety of multi-port interleaved memory system configurations has been put into practice. FIG. 2 depicts a general multi-port interleaved memory system. The memory system comprises N memory modules 21 organized into K sections 22 where section T contains memory module j such that j≡T (modulo K). Accordingly, each section contains N/K memory modules whenever N is evenly divisible by K and approximately N/K memory modules otherwise. Each memory module 21 is comprised of $2^m$ memory banks wherein m is an integer $\geq 0$. In the case where m=0 the memory module contains a single memory bank and the term memory module becomes synonymous with the term memory bank.

Each section 22 of the memory system has M section ports 23 such that each section port has an independent path to every memory module contained within that section. The memory system comprises a total of K×M section ports.

The section ports 23 are connected to one side of the M K-by-K crossbar switches 24 as shown. The section ports 23 are connected such that all section ports denoted by the index 0 issuing from each of the K sections connect to one side of the 0-indexed crossbar switch; all section ports indexed by 1 issuing from each of the K sections connect to one side of the 1-indexed crossbar switch; and so on.

Each line on the other side of each of the M K-by-K crossbar switches is connected to a memory port 26 through a memory port controller 25 associated with that memory port. The memory system thus provides K×M memory ports, and each memory port 26 can be used to serve a request for a vector of data.

Each memory port controller 25 has the appropriate control logic to provide dedicated crossbar with a section index for section selection, to provide the section with the memory module index for module selection, to provide the memory module with the bank index for bank selection, if applicable, and the location index for location selection.

Each memory port 26 of the multi-port memory system is given a priority to resolve conflicting requests over the use of lines of the crossbar switch 24 and banks of memory module 21. The priority of each memory port may change dynamically during operation of the memory system.

The interleaved memory system depicted in FIG. 2 is denoted as an interleaved memory system of the (N,K,M)-type. Using this notation, the single port memory system depicted in FIG. 1 is an interleaved memory of the (N,1,1)-type. The Burrough's Scientific Processor's prime memory system is an interleaved memory system of the (17,17,1)-type, as set forth in Kuck. The memory system in Cray X-MP's two processor configuration is an interleaved memory system of the (32,2,4)-type, as set forth in Cheung, T. and Smith, J., "A Simulation Study of the CRAY X-MP Memory System", IEEE Transactions on Computers, Vol. C-35, pp. 613–622 (July, 1986). In all these examples, each memory module comprises one memory bank.

I. Prime-Way Interleaved Memory Systems

This invention provides methods for the practical implementation of multi-port interleaved memory systems comprising a prime number P of memory modules, i.e., for the (P,K,M)-type interleaved memory systems.

For illustrative purposes, Section I of this document discloses the methods only as applied to a memory system with one section, i.e., K=1. For K>1, the function T=B mod K should be included for mapping memory module B to section T. It should be noted that for clarity of exposition each memory module is considered to comprise only a single memory bank and the methods are generalized to multi-memory-bank modules in Section II of this document.

In the following description, two specific types of prime-way memories are first described. Subsequently, the principles of the invention are extended to include all prime-way interleaved memory systems.

Two specific types of memory systems embodied in this invention are denoted as Mersenne type (M-Type) and Fermat type (F-Type) prime-way interleaved memories. The M-type interleaved memories are those in which the number of memory modules, denoted by P, is both a prime number and a Mersenne number. Mersenne numbers are integers of the general form $(2^k-1)$, wherein k is an integer. The F-type interleaved memories are those in which the number of memory modules is both a prime number and a Fermat number. Fermat numbers are integers of the form $(2^k+1)$, wherein k is an integer.

A further type of memory system may be described as a General-type (G-type) interleaved memory system. The G-type interleaved memory system is one in which the number of memory modules is both a prime number and a number of the general form $2^k \pm \Delta$, wherein $\Delta$ is an integer less than $2^k$.

M-Type Prime-Way Interleaved Memory System

The following description of the principles of the present invention relating to M-type memory systems is presented in three parts. The first part comprises a theoretical discussion which proves the general validity of the method according to the present invention for constructing M-type memories. The second part discloses a method and apparatus for the practical implementation of the method disclosed in the first part. The third part presents an illustrative example for an M-type memory system comprised of 7 memory modules.

An M-type interleaved memory system is comprised of P independent memory modules each of which comprises a single memory bank which contains W words, wherein P is a prime number of the form $P=2^k-1$. Each memory module contains, therefore, W locations wherein $W=2^l$. Generally each location contains a single word and the overall size of the memory system is P×W locations or words.

For any address A in the memory system, such that the address is in the range $0 \leq A \leq (P \times W) - 1$, a binary representation of (l+k) bits is required to express a distinct address in the memory system. Furthermore, a k-bit binary number is required to represent the memory module index B and a l-bit binary number is required to represent the location index within a memory module.

In the following description, it will be demonstrated that a set of three equations serves the identical purpose as the set of equations (1) and (2) in mapping all of the P×W memory addresses into distinct locations of the interleaved memory system.

Equations (3), (4) and (5) are introduced below which provide a method for mapping an address A to location L of a memory module identified by B, where A is in the range $0 \leq A \leq P \times W - 1$, as follows:

$$L = \lfloor A/(P+1) \rfloor \text{ if } A \bmod (P+1) > 0 \tag{3}$$

$$L = 2^{l-k}(2^k-1-(A \bmod 2^k)) + (A/(P+1) \bmod 2^{l-k}) \text{ if } A \bmod (P+1) = 0 \tag{4}$$

$$B = A \bmod P \tag{5}$$

For all P×W memory addresses, equation (5) maps W addresses to the memory module which is identified by the memory module index B. Equations (3) and (4) then map all those addresses mapped onto the memory module identified by B into distinct locations each of which is uniquely identified by a location index L.

Demonstration of the general validity of this principle for all M-type memory systems is disclosed in the following theorem.

THEOREM 1: The method embodied in the use of equations (3), (4) and (5) maps all the P×W addresses into distinct locations of a M-type prime-way interleaved memory system.

The proof comprises the following steps. The lemmas apply to all memory addresses A mapped to a memory module identified by B, i.e., $A \equiv B$ (modulo P). Lemma 1.1 demonstrates that equation (3) maps those memory addresses which are not evenly divisible by (P+1) into contiguous locations of memory module B starting from location zero. Lemma 1.2 shows that there are exactly $2^{l-k}$ addresses A such that A is evenly divisible by (P+1). Lemma 1.4 shows that equation (4) is a bijective function (i.e., an one-to-one mapping) which maps the $2^{l-k}$ addresses not covered by equation (3) into the remaining $2^{l-k}$ locations of memory module B without causing memory contention.

Lemma 1.1: For all addresses mapped to memory module B, that is for all addresses A such that $A \equiv B$ (modulo P), 1. $\lfloor A/(P+1) \rfloor = \lfloor (A+P)/(P+1) \rfloor - 1$
   if $A \bmod (P+1) > 0$.

2. $\lfloor A/(P+1) \rfloor = \lfloor (A+P)/(P+1) \rfloor$
   if $A \bmod (P+1) = 0$.

Proof: The proof is obtained immediately upon substitution for P and inspection.

Note that A+P is the next successive address of A mapped to memory module B. The first part of the lemma reveals that the use of equation (3) maps all those memory addresses mapped to memory module B which are not evenly divisible by (P+1) into contiguous locations of memory module B, starting from location zero. This part of the memory module will be termed the primary stratum of the memory module B. The second part of the lemma shows that when A is evenly divisible by (P+1) the use of equation (3) maps two different addresses A and A+P into the same location creating memory contention and corruption of data.

Lemma 1.2 : All memory addresses mapped to memory module B are expressible in the form $A=(i \times P)+B$ where i is any integer in the range $0 \leq i \leq 2^l-1$. Then, there are exactly $2^{l-k}$ addresses A such that A is evenly divisible by (P+1).

Proof: For an M-type memory system $P+1=2^k$ in which the address is evenly divisible by (P+1), $A \bmod 2^k=0$. For all addresses mapped to memory module B, therefore, $((i \times P)+B) \bmod 2^k=0$. This implies that $(i \bmod 2^k)P+B \equiv 0$ (modulo $2^k$) which holds for all i if and only if i is of the general form $i=(j \times 2^k)+B$, where j is an integer. There are exactly $2^{l-k}$ such values of i.

The two preceding lemmas show that the use of equation (3) in determining the location in memory module B will map memory addresses to contiguous $2^{l-k}P$ locations of memory module B starting from location zero, i.e., to the primary stratum of memory module B.

Lemma 1.3: For any function $X=(a \times P)+B$ where $0 \leq a \leq 2^m-1$, the function $X \bmod 2^m$ is a bijective mapping.

Proof: It is shown that for any two integers $0 \leq b,c \leq 2^m-1$, if b does not equal c, then $b \times P+B \neq c \times P+B$ (modulo $2^m$). The proof is shown by contradiction. Start with the converse statement and let b>c. This means that $(b-c)P=D \times 2^m$ for some $D \geq 1$ and $(b-c)=(D \times 2^m)/P$. However, $(D \times 2^m)$ is evenly divisible by P if and only if D is evenly divisible by P. This condition implies that (b-c) is evenly divisible by $2^m$. Since b and c must be in the range $0 \leq b,c \leq 2^m-1$, the condition is satisfied only by b =c which is a contradiction.

Lemma 1.4 : For any address mapped to memory module B of the general form $A=(i \times P)+B$ wherein $0 \leq i \leq 2^l-1$ and A is evenly divisible by (P+1), then $(A/(P+1)) \bmod 2^{l-k}$ is a bijective mapping.

Proof: The proof follows from lemma 1.3. Since the A is evenly divisible by (P+1), then the integer i must be of the general form $i=j \times 2^k+B$. Hence $A/(P+1)=(j \times P)+B$ wherein $0 \leq j \leq 2^{l-k}-1$ and $(A/(P+1)) \bmod 2^{l-k}$ is a bijective mapping.

The final step in the proof follows by inspection of equation (4). In equation (4) $A \bmod 2^k=0$ and $(A/(P+1)) \bmod 2^{l-k} \geq 0$ and, therefore, the value of L obtained from equation (4) is greater than or equal to $(2^{l-k})P=(2^{l-k})(2^k-1)$. Accordingly, equation (4) will map the remaining $2^{l-k}$ addresses into the remaining $2^{l-k}$ locations of memory module without memory contention.

Theorem 1 demonstrates that equations (3), (4) and (5) for the M-type interleaved memory system map all memory addresses into distinct locations of the memory system. Equation (3) maps address A for which A is not evenly divisible by the integer (P+1) into $(2^l-2^{l-k})$ distinct memory locations of the memory module identified by B, termed the primary stratum; and equation (4) maps the remaining addresses which are evenly divisible by (P+1) into the remaining $2^{l-k}$ locations of the memory module B in a one-to-one manner, which is termed the secondary stratum of the memory module B.

The method embodied in the use of equations (3), (4) and (5) of the present invention for a M-type memory system completely avoids the use of equation (1), which would involve division by a prime number. Division by a prime number requires multiple clock cycles and offsets any advantages gained by employing a prime number of memory modules to increase memory bandwidth.

The next part of this disclosure describes a method and apparatus in the form of hardware for the practical implementation of the general method of the present invention. Specifically, a method and apparatus are disclosed in which equations (3) and (4) can be computed in O(1) gate delays and equation (5) can be computed in $O(\log_2 n)$ gate delays. This aspect of the disclosure is critical to practical application of this invention.

Equation (3) is used to compute L whenever the address A is not evenly divisible by (P+1). The address A can be represented in the conventional manner by a binary string of l+k bits. If A were evenly divisible by (P+1) $=2^k$ then the least significant (right-most) k bits in the binary representation must necessarily be all equal to zero. The result of division by $2^k$ produces a bit string in which the original bit string is truncated at the right by removing the k bits. This results in a l-bit string. However, equation (3) is employed when A is not evenly divisible be (P+1) and hence the least significant k bits of A are not all zeros. Division of A by (P+1) in equation (3) results in an integer represented by the most significant l bits of the original representation of A and a remainder represented by the least significant k bits of the original representation of A. Accordingly, the result of performing the "floor operation" which is defined as finding the greatest integer less than or equal to A/(P+1) is necessarily represented by the l-bit string formed by truncation at the right of the original representation for A ((l+k)-bit string) by removing the least significant k bits of the original bit string representation for A. The computation of equation (3) can be accomplished with conventional hardware in O(1) gate delays, as discussed in greater detail below with reference to FIG. 3.

Equation (4) is used to compute L whenever the address is evenly divisible by (P+1). Inspection of equation (4), shows that the first term reduces to the product $(2^{l-k})(2^k-1)$. In binary notation $(2^{l-k})$ is a (l–k+1)-bit string comprised of an 1 followed by (l–k) 0's; and $(2^k-1)$ is a bit string of k 1's. The product is a l-bit string in which the first k bits are all 1's and the remaining (l–k) bits are all 0's. In the second term of equation (4) the address is necessarily represented by a (l+k)-bit string in which the least significant k bits are all 0's and division by $2^k$ results in a l-bit string comprised of the most significant l bits of the original representation of A. The result of the operation mod $2^{l-k}$ generates a number which is necessarily less than $2^{l-k}$ and is represented by a l-bit binary string in which the most significant k bits are all zeros and the remaining (l–k)-bit string is exactly the least significant l–k bits of the result of A/(P+1). It should be noted that this (l–k)-bit string is the truncated (l–k)-bit representation of A formed by removing both the most significant k bits of A and the least significant k bits of A. The computation of L in equation (4) is obtained by juxtaposing the two terms.

The computation of L in equation (4) is, therefore, directly equivalent to forming the binary string representation of L in which the most significant k bits of L are comprised of the bit-wise complement of the least significant k bits of the address A (i.e., a string of k-bits all of which are 1's); followed by the (l–k)-bit string obtained from the original address A by removing the most significant k bits and the least significant k bits. The computation of equation (4) can be achieved in O(1) gate delays, as described in greater detail below with reference to FIG. 3.

Figure 3:
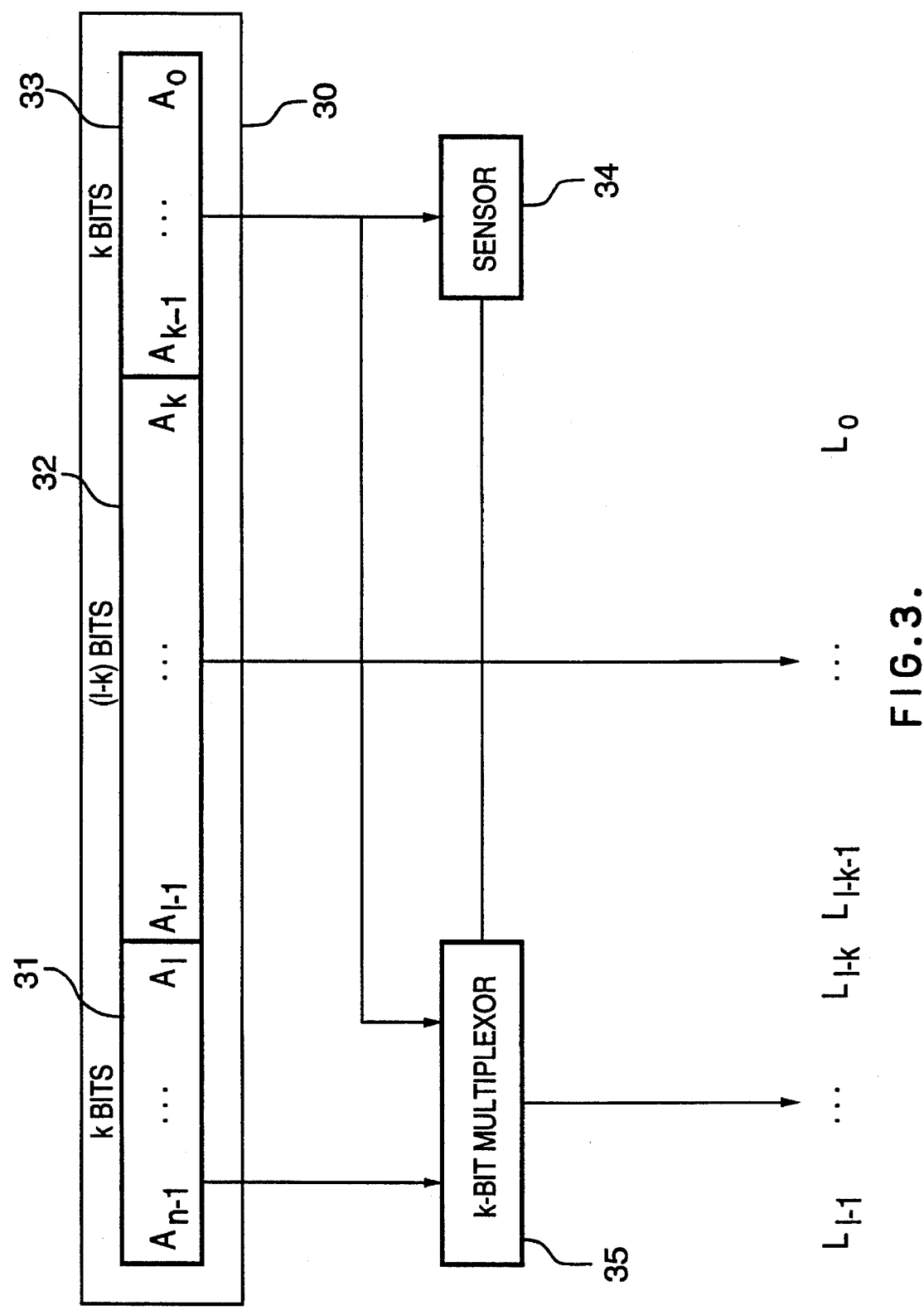
FIG. 3 depicts an apparatus for computation of the memory location index L for the Mersenne type (M-Type) prime-way interleaved memory system disclosed herein according to one aspect of the present invention.

FIG. 3 illustrates apparatus comprising a combination of conventional hardware devices configured in a manner so as to compute equations (3) and (4) in a constant number of gate delays.

FIG. 3 depicts any memory address A represented by the n-bit (n=l+k) binary string $A_{n-1} \ldots A_0$, contained in an register 30 in which the register bits are numbered from right to left starting with bit 0. The address register is partitioned from left to right, as shown in FIG. 3, into three segments of k bits 31, (l–k) bits 32 and k bits 33 such that the first k-bit segment comprises the address bits $A_{n-1} \ldots A_l$, the second (l–k)-bit segment comprises the address bits $A_{l-1} \ldots A_k$ and the third k-bit segment comprises the address bits $A_{k-1} \ldots A_0$. If A is evenly divisible by (P+1) the right k-bit segment 33 in the partitioned register contains all zero elements and has a value of zero.

The apparatus is configured so that a sensor 34 determines whether A is evenly divisible by (P+1).

If A is not evenly divisible by (P+1), the apparatus employs a k-bit multiplexer (MUX) 35 to concatenate the left k-bit segment 31 of the address register with the middle (l–k)-bit segment 32. The output from MUX 25 yields the first k bits of the location index L. The location index L is, therefore, the l-bit binary string $A_{n-1} \ldots A_{l-1}A_k \ldots A_k$. If A is evenly divisible by (P+1), the apparatus employs the k-bit multiplexer 35 to concatenate the bit-wise complement of the right k-bit segment 33 of the address register 30 with the middle (l–k)-bit segment 32. The output from MUX 35 yields the first k bits of the location index L. The location index L is, therefore, the l-bit binary string $\overline{A_{k-1}} \ldots \overline{A_0}A_{l-1} \ldots A_k$.

It can be shown readily that the simple combination of well known hardware components in FIG. 3 can compute L in a constant number of gate delays.

In the following, the computation of the module index B in $O(\log_2 n)$ gate delays where n is the number of bits of memory address is shown.

The following description for the computation of equation (5) is based upon known techniques set forth in Knuth. The computation of equation (5), $B=A \bmod P=A \bmod (2^k-1)$, is equivalent to the addition of $\lceil n/k \rceil$ k-bit binary numbers in one's complement arithmetic, where n=l+k. The n-bit address A is partitioned into m k-bit groups where $m=\lceil n/k \rceil$. The address A is then re-expressed as a string of m k-bit groups, i.e., $A=a_{m-1} \ldots a_1 a_0$. The value of the n-bit address A can be represented by employing k-bit groups in the form $$A=a_{m-1}Q^{m-1}+ \ldots +a_iQ+a_0$$

where $Q=2^k$, $m=\lceil n/k \rceil$, $0 \leq a_i \leq 2^k-1$, for all i such that $0 \leq i \leq m-1$. Then, computation of A mod $(2^k-1)$ is equivalent to computing $$a_{m-1} + \ldots +a_1+a_0 \text{ (modulo } (2^k-1))$$

since $Q \equiv 1$ (modulo $(2^k-1)$).

The computation of this expression is achieved by using the following known approach. It is known that for any k-bit number a if $a=2^k-1$ is allowed as an alternative to a=0, i.e., $$0 \leq a \leq 2^k-1, a \equiv A \text{ (modulo } (2^k-1)) \qquad (6)$$

the basic operation of addition (modulo $(2^k-1)$) is equivalent to the following operation defined for any two k-bit binary numbers a and b in the range $0 \leq a,b \leq 2^k-1$:

$$a +' b = \begin{cases} a+b & \text{if } a+b < 2^k \\ ((a+b) \bmod 2^k) + 1 & \text{if } a+b \geq 2^k \end{cases} \qquad (7)$$

Therefore, A mod $(2^k-1)$ is computed using convention (6) by simple addition of the $\lceil n/k \rceil$ k-bit binary number $a_{m-1} +' \ldots +'a_1+'a_0$ using the addition operation defined in equation (7). The summation of the $\lceil n/k \rceil$ k-bit binary numbers using this convention is achieved by using the known technique termed a Wallace tree, see Wallace, C. C., "A Suggestion for a Fast Multiplier", IEEE Transactions on Electronic Computers, Vol. EC-13, pp. 14–17 (1964), to compress the $\lceil n/k \rceil$ numbers into two k-bit numbers and then the resulting two k-bit numbers are added to form a single k-bit number B using a fast k-bit adder such as a carry-lookahead adder.

The following recurrence expresses the time, T(m), in full-adder delays to compress m numbers of k-bits each into two k-bit numbers using the Wallace tree technique:

$$T(m) = \begin{cases} T(\lceil 2m/3 \rceil) + 1 & \text{if } m > 3 \\ 1 & \text{if } m = 3 \end{cases}$$

Thus, the total time required to compute equation (5) is $O(\log_2 n)$ gate delays.

Therefore, according to the foregoing description of the embodiment of the present invention as it pertains to M-Type prime-way interleaved memory systems, a method and apparatus provide for the practical computation of equations (3) and (4) in O(1) gate delays and for the computation of equation (5) in $O(\log_2 n)$ gate delays.

The following example illustrates an M-type prime-way interleaved memory system using the invention disclosed herein. In this example, for k=3 the corresponding prime Mersenne number is $P=2^k-1=7$. For illustration l=4 and the size of a memory module is $W=2^l=16$. Accordingly, the total number of locations in the memory system is $P \times W = 7 \times 16 = 112$.

The set of equations (3), (4) and (5) will be used to map all memory addresses A in the range $0 \leq A \leq 111$ into distinct locations of the memory system.

Using equation (5), all memory addresses A such that B=A mod P are mapped into memory module B. Accordingly, memory module B with memory module index B=0 contains all addresses such that upon division by P=7 the remainder is 0. Therefore, memory module B=0 contains the memory addresses 0, 7, 14, 21, 28, 35, 42, 49, 56, 63, 70, 77, 84, 91, 98, 105.

Similarly, the memory module with memory module index B=1 contains all addresses such that upon division by P=7 the remainder is 1. The addresses mapped to each memory module for a module index from 0 to 6 is readily obtained in this manner.

The location index L within each memory module is computed by equation (3) if and only if the address A is not evenly divisible by (P+1) and by equation (4) otherwise. Furthermore, the addresses mapped to module B which are covered by equation (3) are mapped to the first $(2^{l-k})P$ locations starting with location index zero, the primary stratum, and the remaining addresses to the secondary stratum of memory module B.

Systematic application of the equations (3) and (4) to the addresses mapped to module B=0 yields the following results:

The memory addresses evenly divisible by (P+1)=7+1=8 are all mapped to the secondary stratum of memory module B=0 and there are exactly $2^{l-k}=2^{4-3}=2$ such locations. Memory address 0 is evenly divisible by (P+1)=7+1=8 by convention and so is memory address 56. Accordingly, equation (4) maps memory address 0 into location $L=2(2^3-1-(0 \bmod 8))+(0/8 \bmod 2)=2(7)+0=14$; and maps memory address 56 into location $L=2(8-1-(56 \bmod 8))+(56/8 \bmod 2)=2(7-0)+(7 \bmod 2)=14+1=15$.

The memory addresses not evenly divisible by (P+1)=8 are all mapped to the primary stratum of memory module B=0 and there are exactly $(2^{l-k})P=2 \times 7=14$ such locations. Memory address 7 is mapped by equation (3) into location $L=\lfloor A/(P+1) \rfloor = \lfloor 7/8 \rfloor = 0$ of memory module B=0. The remaining addresses are similarly mapped by equation (3) into distinct locations in the primary stratum of memory module B=0.

Similar computations for the memory addresses mapped to the other memory modules can be carried out. Table 1 depicts the distribution of all memory addresses in the memory system using the invention disclosed herein for M-type prime-way interleaved memories.

TABLE 1

EXAMPLE OF M-TYPE PRIME-WAY INTERLEAVED MEMORY SYSTEM
[P = 7; l = 4; 0 ≤ A ≤ 111]

| Location | Memory Module | | | | | | |
|---|---|---|---|---|---|---|---|
| | 0 | 1 | 2 | 3 | 4 | 5 | 6 |
| 0 | 7 | 1 | 2 | 3 | 4 | 5 | 6 |
| 1 | 14 | 15 | 9 | 10 | 11 | 12 | 13 |

TABLE 1-continued

EXAMPLE OF M-TYPE PRIME-WAY INTERLEAVED MEMORY SYSTEM
[P = 7; l = 4; 0 ≤ A ≤ 111]

| Location | Memory Module | | | | | | |
|---|---|---|---|---|---|---|---|
| | 0 | 1 | 2 | 3 | 4 | 5 | 6 |
| 2 | 21 | 22 | 23 | 17 | 18 | 19 | 20 |
| 3 | 28 | 29 | 30 | 31 | 25 | 26 | 27 |
| 4 | 35 | 36 | 37 | 38 | 39 | 33 | 34 |
| 5 | 42 | 43 | 44 | 45 | 46 | 47 | 41 |
| 6 | 49 | 50 | 51 | 52 | 53 | 54 | 55 |
| 7 | 63 | 57 | 58 | 59 | 60 | 61 | 62 |
| 8 | 70 | 71 | 65 | 66 | 67 | 68 | 69 |
| 9 | 77 | 78 | 79 | 73 | 74 | 75 | 76 |
| 10 | 84 | 85 | 86 | 87 | 81 | 82 | 83 |
| 11 | 91 | 92 | 93 | 94 | 95 | 89 | 90 |
| 12 | 98 | 99 | 100 | 101 | 102 | 103 | 97 |
| 13 | 105 | 106 | 107 | 108 | 109 | 110 | 111 |
| 14 | 0 | 64 | 16 | 80 | 32 | 96 | 48 |
| 15 | 56 | 8 | 72 | 24 | 88 | 40 | 104 |

Note that in this illustrative example the primary stratum of the M-type prime-way interleaved memory system is comprised for each memory module B of the 14 locations with location indices from 0 to 13; and the secondary stratum is comprised of the 2 locations with location indices 14 and 15.

The location indices can be directly computed according to the method of the present invention using the apparatus discussed above with reference to FIG. 3 by expressing each memory address in binary representation and performing the partitions and concatenations prescribed. For example, memory address 70 in the primary stratum can be represented in binary notation by the 7-bit string {1,0,0,0,1,1,0}. The memory address A is partitioned in accordance with the method of the present invention into the form {[1,0,0] [0] [1,1,0]}. Since the right 3-bit segment [1,1,0] does not contain all zeros the address A is not evenly divisible by (P+1)=8 and the location index L is obtained directly by concatenating the left 3-bit segment [1,0,0] with the middle 1-bit segment [0] to obtain the 4-bit string {1,0,0,0}. Hence the location index L=8.

For memory address 56, the binary representation is the 7-bit string {0,1,1,1,0,0,0}. The memory address is partitioned as prescribed into the form {[0,1,1] [1] [0,0,0]}. The right 3-bit segment [0,0,0] is all zeros and, therefore, the location index is the 7-bit string obtained by concatenation of the bit-wise complement of the right 3-bit segment [0,0,0], i.e., by the concatenation of the segment [1,1,1] with the middle 1-bit segment [1]. Hence L is the 4-bit segment {1,1,1,1} and the location index is L=15.

F-Type Prime-Way Interleaved Memory Systems

The approach employed in the preceding disclosure for M-type memory systems is extended in the following description to F-type prime-way interleaved memory systems. The method and apparatus disclosed for F-type memories are similar to that described for M-type memories. Accordingly, the description of this embodiment of the invention will be compressed to avoid unnecessary repetition.

The description of the embodiment of the invention relating to F-type memory systems will be presented in three parts. The first part comprises a theoretical discussion which proves the general validity of the method of the present invention for F-type memories. The second part discloses a method and apparatus for the practical implementation of the method. The third part presents an illustrative example of an F-type memory system comprised of five memory modules.

A F-type memory system is comprised of P memory modules, wherein P is both a prime number and a Fermat number, i.e., P is a number of the general form $2^k+1$. Each single bank memory module contains $W=2^l$ words. The overall size of the memory system is P×W words.

In the following description it will be demonstrated that a further set of three equations serves the identical purpose for a F-type memory system as the set of equations (1) and (2) and maps the P×W memory addresses into P×W distinct locations in the interleaved memory system.

Equations (8), (9) and (10) are introduced below which provide a method for mapping an address A to location L of a memory module identified by B, where A is in the range $0 \leq A \leq (P \times W)-1$, as follows:

$$L = \lfloor A/2(P-1) \rfloor \text{ if } A \bmod 2(P-1) \geq (P-2) \quad (8)$$

$$L = 2^{l-k-1}(2^{k+1}-1-(A \bmod 2^{k+1})) + (\lfloor A/2(P-1) \rfloor \bmod 2^{l-k-1}) \text{ if } A \bmod 2(P-2) < (P-2) \quad (9)$$

$$B = A \bmod P \quad (10)$$

The general validity of this method for all F-type memory systems is stated below in Theorem 2 and proven thereafter.

For all P×W memory addresses, equation (10) maps W addresses to the memory module which is identified by the memory module index B. Equations (8) and (9) then map all those addresses mapped onto memory module B into distinct locations of memory module B each of which is uniquely identified by a location index L.

THEOREM 2: The method embodied in the use of equation (8), (9) and (10) maps all of the P×W addresses into distinct locations in the F-type prime-way interleaved memory system.

The proof comprises the following steps. The lemmas apply to all addresses mapped to memory module B such that $A \equiv B$ (modulo P). Lemma 2.1 demonstrates that equation (8) maps those memory addresses A such that A mod $2(P-1) \geq (P-2)$ into contiguous locations of memory module B starting from location zero, the primary stratum. Lemma 2.2 shows that there are exactly $2^{l-k-1}(P-2)$ memory addresses such that A mod $2(P-1)<(P-2)$. Lemma 2.3 shows that equation (9) is a bijective function which maps the $2^{l-k-1}(P-2)$ addresses not covered by equation (8) into the remaining $2^{l-k-1}(P-2)$ distinct locations of memory module B, the secondary stratum, without causing memory contention.

Lemma 2.1: For all addresses mapped to memory module B, i.e., for all addresses A such that $A \equiv B$ (modulo P), 1. $\lfloor A/2(P-1) \rfloor = \lfloor (A+P)/2(P-1) \rfloor -1$ if A mod $2(P-1) \geq P-2$;

2. $\lfloor A/2(P-1) \rfloor = \lfloor (A+P)/2(P-1) \rfloor$ if A mod $2(P-1)<P-2$.

Proof: For a F-type system $P=2^k+1$. Upon substitution for P in the above equations the lemma is proven by inspection.

The first part of the lemma reveals that the use of equation (8) to determine L maps all memory addresses whose remainder mod $2(P-1) \geq (P-2)$ into consecutive locations of memory module B starting from location zero. The second part of the lemma shows that for all addresses whose remainder mod $2(P-1) < (P-2)$ the use of equation (8) would map two different memory addresses A and A+P into the same location of memory module B thereby creating memory contention.

Lemma 2.2 : All memory addresses mapped to memory module B are expressible in the form $A=(i \times P)+B$ where i is any integer in the range $0 \leq i \leq 2^l-1$. Then, there are exactly $(P-2)2^{l-k-1}$ addresses mapped to memory module B such that A mod 2 $(P-1)<(P-2)$.

Proof: For any F-type memory system $2(P-1)=2^{k+1}$ and, by lemma 1.3, the mapping $((j \times P)+B) \bmod 2^{k+1}$ is bijective. Then for any j in the range $0 \leq j \leq 2^{k+1}-1$, $A \equiv C$ (modulo $2^{k+1}$) if and only if $i \equiv j$ (modulo 2k+1). Hence, there are exactly $2^{l-k-1}$ addresses whose remainder (mod $2^{k+1}$) equals C and lemma 2.2 follows by including those C whose value is less than (P−2).

Consequently, the use of equation (8) maps exactly $(2^{l-k-1})P$ memory addresses A such that A mod $2^{k+1} \geq (P-2)$ into $(2^{l-k-1})P$ contiguous locations of memory module B starting with location zero, the primary stratum.

Lemma 2.3: For all memory addresses mapped to memory module B, i.e., for all addresses $A=(i \times P)+B$ wherein $0 \leq i \leq 2^l-1$ such that A mod $2^{k+1}<P-2$, then equation (9) is a bijective function.

Proof: For $A \equiv C$ (modulo $2^{k+1}$) and $C<P-2$, $\lfloor A/2(P-1) \rfloor$ mod $2^{l-k-1}$ is bijective. Furthermore, for two different addresses D and E such that $D \equiv E$ (modulo $2^{k+1}$) the first terms of equation (9) will differ.

Since A mod $2^{k+1}<(P-2)$, then $2^{k+l}-1-(A \bmod 2^{k+l}) \geq 2^k+1$, and since $\lfloor A/(2(P-1)) \rfloor$ mod $2^{l-k-l-1} \geq 0$ the value of L computed by equation (9) is equal to or greater than $(2^{l-k-1})P$. Therefore, by lemma 2.3 equation (9) maps the $(P-2)2^{l-k-1}$ memory addresses not covered by equation (8) into the remaining $(P-2)2^{l-k-1}$ distinct locations of memory module B without memory contention.

From the foregoing description it is clear that the method of address mapping for F-type memory systems defined by equations (8) and (9) avoids the use of equation (1) which involves division by a prime number. The computation of equations (8) and (9) involves only logic operations which can be computed in O(1) gate delays as discussed in greater detail below.

A method and apparatus will now be provided for implementing the address mapping method discussed above for F-type memories, which are capable of computing equations (8) and (9) in O(1) gate delays and equation (10) in $O(\log_2 n)$ gate delays.

Figure 4:
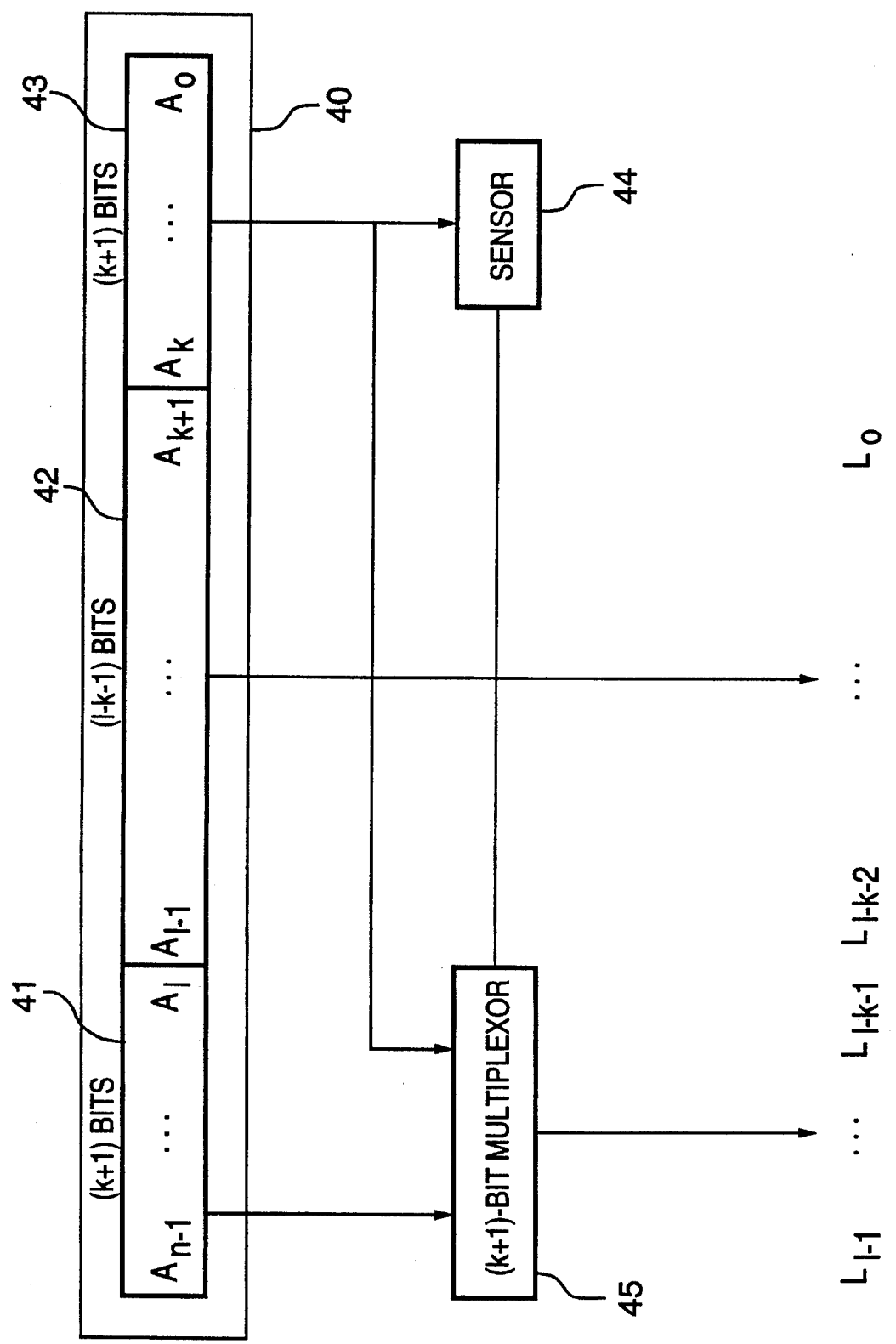
FIG. 4 depicts an apparatus for computation of the memory location index L for the Fermat type (F-Type) prime-way interleaved memory system disclosed herein according to another aspect of the present invention.

The hardware organization illustrated in FIG. 4 is based upon an analysis of equations (8) and (9) which is similar to that described above in connection with the embodiment of FIG. 3 relating to the corresponding equations (3) and (4) employed for M-type memories. The detailed steps in the analysis are analogous to the discussion relating to M-type memories and are, therefore, not included.

FIG. 4 shows a simple combination of conventional hardware components which are employed to compute equations (8) and (9) in a constant number of gate delays.

According to the embodiment of FIG. 4 any memory address A may be represented by the n-bit binary string $A_{n-1} \ldots A_0$ such that $n=l+k+1$ contained in register 40 in which the register bits are numbered from right to left starting with bit zero. This memory address register is partitioned from left to right, as shown in FIG. 4, into three segments of k+1 bits (denoted as 41), l−k−1 bits (denoted as 42) and k+1 bits (denoted as 43). The first (k+1)-bit segment 41 comprises the address bits $A_{n-1} \ldots A_l$. The second (l−k−1)-bit segment 42 contains address bits $A_{l-1} \ldots A_{k+1}$ and the third segment 43 contains the address bits $A_k \ldots A_0$.

Note that A mod $2^{k+1}<(P-2)$ if and only if $A_k$ is 0 and the segment $A_{k-1} \ldots A_0$ is not a string of k 1's. A sensor 44 is employed to directly test this condition on the right (k+1)-bit segment 43 of the partitioned address register 40.

If the preceding condition does not hold, equation (8) is obtained by employing the output of (k+1)-bit multiplexer (MUX) 45 to form the first (k+1)-bit segment of the location index. The location index L is, therefore, directly obtained by the concatenation of the left (k+1)-bit segment 41 with the middle (l−k−1)-bit segment 42 of the partitioned address register 40. The location index L is, therefore, the l-bit string represented by $L=A_{n-1} \ldots A_i A_{l-1} \ldots A_{k+1}$. If the test condition holds, equation (9) is computed by combining the (k+1)-bit multiplexer output 45 with the middle (l−k−1)-bit segment 42 and, thereby, forming the concatenation of the bitwise complement of the right (k+1)-bit segment 43 with the middle (l−k−1)-bit segment 42 of the partitioned address register 40. The location index L is, therefore, the l-bit binary string represented by $$\overline{A}_k \ldots \overline{A}_0 A_{l-1} \ldots A_{k+1}.$$

Since only logic operations are employed to compute equations (8) and (9) then the computation can be achieved in O(1) gate delays.

The computation of equation (10), $B = A \mod P = A \mod (2^k+1)$, can be accomplished by adding and subtracting $\lceil Fn/k \rceil$ (k+1)-bit binary numbers wherein n=l+k+1. A variation of the known technique employed in the preceding for M-type memories is used. The n-bit address A is partitioned into m k-bit binary numbers wherein $m = \lceil n/k \rceil$.

The n-bit address A can be expressed by employing k-bit groups in the form, $$A = a_{m-1} Q^{m-1} + \ldots a_1 Q + a_0,$$

wherein $Q=2^k$, $m=\lceil n/k \rceil$ and $0 \leq a_i \leq 2^k-1$, for all i in the range $0 \leq i \leq m-1$. Then, since $Q \equiv -1 \pmod{2^k+1}$, the computation of the equation $A \mod (2^k+1)$ is equivalent to computing $$(-1)^{m-1} a_{m-1} + \ldots + a_1 + a_0 \pmod{2^k+1}.$$

The operations of addition and subtraction (modulo $2^k+1$) can be accomplished by using a technique embodied in the following formulae:

$$a +' b = \begin{cases} a+b & \text{if } a+b \leq 2^k \\ ((a+b) \bmod 2^k) - 1) & \text{if } a+b \geq 2^k+1 \end{cases}$$

and $$a -' b = \begin{cases} a-b & \text{if } a-b \geq 0 \\ ((a-b) \bmod 2^k) + 1 & \text{if } a-b < 0 \end{cases}$$

wherein a and b are any two numbers such that a and b are numbers in the range $0 \leq a, b \leq 2^k$. The computation of A mod P is now equivalent to the addition and subtraction of the $\lceil n/k \rceil$ k-bit binary numbers, $$(-1)^{m-1} a_{m-1} +' \ldots -' a_1 +' a_0$$

by using the formulae introduced above.

In practice the addition and subtraction of the $\lceil n/k \rceil$ k-bit binary numbers is accomplished by first employing a Wallace tree to compress the $\lceil n/k \rceil$ numbers to two (k+1)-bit binary numbers and then adding the resulting two numbers to form B by using a fast (k+1)-bit adder such as a carry-lookahead adder.

Therefore, according to the foregoing description of the embodiment of the present invention as it pertains to F-Type prime-way interleaved memory systems, a method and apparatus are provided for the computation of equations (8) and (9) in O(1) gate delays and for the computation of equation (10) in $O(\log_2 n)$ gate delays.

The following example illustrates an F-Type prime-way interleaved memory system using the invention disclosed herein. In this example, for k=2, the corresponding prime Fermat number is $P=2^k+1=5$. For illustration l=4 and the size of any memory module is $W=2^l=2^4=16$. The total number of locations in the memory system is $P \times W = 5 \times 16 = 80$.

The set of equations (8), (9) and (10) will be used to map all memory addresses A in the range $0 \leq A \leq 79$ into distinct locations of the memory system.

Using equation (10), all memory addresses A such that $B = A \mod P$ are mapped into memory module B. Accordingly, memory module B with memory module index B=0 contains all addresses such that upon division by P=5 the remainder is 0. Therefore, memory module B=0 contains the memory addresses 0, 5, 10, 15, 20, 25, 30, 35, 40, 45, 50, 55, 60, 65, 70, 75.

Similarly, the memory module with memory module index B=1 contains all addresses such that upon division by P=5 the remainder is 1. The address sequence mapped to each memory module for a module index from 0 to 4 is readily obtained in this manner.

The location index within each memory module is computed by equation (8) if and only if $A \mod 2(P-1) \geq (P-2)$ and by equation (9) otherwise. Furthermore, the addresses mapped to module B which are covered by equation (8) are mapped to the first $2^{l-k-1} P$ locations starting with location index zero, the primary stratum, and the remaining addresses to the secondary stratum of the memory module B.

Systematic application of the equations (8) and (9) to the addresses mapped to module B=0 yields the following results:

The memory addresses governed by equation (8) are those such that $A \mod 2(P-1) \geq (P-2)$, i.e., where $A \mod 8 \geq 3$. There are exactly $2^{l-k-1} P = 2^{4-2-1}(5) = 2 \times 5 = 10$ such memory addresses starting with location index 0. The addresses which fall into the primary stratum are those whose remainders upon division by 8 are greater than or equal to 3. Therefore, the 10 addresses which fall into the primary stratum of the memory module are 5, 15, 20, 30, 35, 45, 55, 60, 70, 75. The remaining 6 addresses are mapped into the secondary stratum of the memory module and are 0, 10, 25, 40, 50, 65.

Equation (8) maps address 5 into location $L = \lfloor A/2(P-1) \rfloor = \lfloor 5/8 \rfloor = 0$ and address 15 into location $L = \lfloor 5/10 \rfloor = 1$. The location indices for the remaining addresses mapped into the primary stratum are obtained from equation (8) in a similar manner.

Equation (9) maps address 0 into location $L = 2(2^3 - 1 - (0 \bmod 2^3) + \lfloor 0/4 \rfloor \bmod 2) = 2(7) + 0 = 14$. The location indices for the remaining addresses which fall into the secondary stratum are mapped by equation (9) in a similar manner.

Similar computations for memory addresses mapped to the other memory modules can be carried out. Table 2 depicts the distribution of all memory addresses in the system according to the invention disclosed herein for F-Type prime-way interleaved memory systems.

TABLE 2

EXAMPLE OF F-TYPE PRIME-WAY INTERLEAVED MEMORY SYSTEM
[P = 5; l = 4; 0 ≤ A ≤ 79]

| Location | Memory Module | | | | |
|---|---|---|---|---|---|
| | 0 | 1 | 2 | 3 | 4 |
| 0  | 5  | 6  | 7  | 3  | 4  |
| 1  | 15 | 11 | 12 | 13 | 14 |
| 2  | 20 | 21 | 22 | 23 | 19 |
| 3  | 30 | 31 | 27 | 28 | 29 |
| 4  | 35 | 36 | 37 | 38 | 39 |
| 5  | 45 | 46 | 47 | 43 | 44 |
| 6  | 55 | 51 | 52 | 53 | 54 |
| 7  | 60 | 61 | 62 | 63 | 59 |
| 8  | 70 | 71 | 67 | 68 | 69 |
| 9  | 75 | 76 | 77 | 78 | 79 |
| 10 | 50 | 66 | 2  | 18 | 34 |
| 11 | 10 | 26 | 42 | 58 | 74 |
| 12 | 65 | 1  | 17 | 33 | 49 |
| 13 | 25 | 41 | 57 | 73 | 9  |
| 14 | 0  | 16 | 32 | 48 | 64 |
| 15 | 40 | 56 | 72 | 8  | 24 |

Note that in this illustration for an F-Type prime-way interleaved memory system the primary stratum of each memory module is comprised of the 10 locations with location indices from 0 to 9; and the secondary stratum is comprised of the 6 locations with location indices from 10 to 15.

The location indices can also be obtained directly by application of the method and apparatus discussed above with reference to FIG. 4.

General Prime-Way Interleaved Memory Systems

The preceding description of embodiments of the present invention regarding M-type and F-type prime-way interleaved memory systems may be extended to include prime-way interleaved memories wherein the number of memory modules can be any arbitrary prime number.

The following description discloses a method for the construction of G-type interleaved memory systems comprised of P memory modules such that P is both a prime number and is of the form $P=2^k \pm \Delta$ wherein $\Delta$ is an integer less than $2^k$.

The first G-type memory system to be considered is an extension of the M-type memories such that the prime number of memory modules P is of the form $P=2^k-\Delta$. Such an extension is denoted a GM-type memory system. The second G-type memory is an extension of the F-type memories such that the prime number of memory modules is of the form $P=2^k+\Delta$. Such an extension is denoted a GF-type memory system. In the following description, W is the size of a single bank memory module. The overall size of the memory system is P×W.

The disclosure for each type of memory comprises two parts, firstly, a proof of the general validity of the method and, secondly, a method and apparatus for the practical implementation of the method.

GM-Type Prime-Way Interleaved Memory Systems

The description of the embodiment of the invention relating to GM-type ($P=2^k-\Delta$) memory systems follows a line of argument parallel to that for M-type memories. It should be noted that the M-type memory system is a special case of the GM-type memory system wherein $\Delta=1$.

The following description discloses a set of three equations which serve the identical purpose as do equations (1) and (2) in mapping all of the P×W memory addresses into distinct locations of the GM-type prime-way interleaved memory system.

For any memory address A in the range $0 \leq A \leq (P \times W) - 1$ the following equations map A to location L of memory module B.

$$L = \lfloor A/(P+\Delta) \rfloor \text{ if } A \bmod 2^k \geq \Delta \tag{11}$$

$$L = 2^{l-k}(2^k-1-(A \bmod 2^k))+\lfloor A/(P+\Delta) \rfloor \bmod 2^{l-k} \text{ if } A \bmod 2^k < \Delta \tag{12}$$

$$B = A \bmod P \tag{13}$$

The general validity of the method embodied in equations (11), (12) and (13) for all GM-type memory systems is stated in the following theorem and proved thereafter.

THEOREM 3: The method embodied in the use of equations (11), (12) and (13) maps all the P×W addresses into distinct locations of a GM-type prime-way interleaved memory system.

The proof proceeds in a parallel manner to that for M-type memories. For all memory addresses mapped into memory module B, i.e., all $A \equiv B$ (modulo P), the following steps prove the theorem. Lemma 3.1 demonstrates that equation (11) maps all those memory addresses such that $A \bmod 2^k \geq \Delta$ into distinct locations of the contiguous set of locations in memory module B starting with location zero, the primary stratum. Lemma 3.2 shows that there are exactly $\Delta \times 2^{l-k}$ memory addresses such that $A \bmod 2^k < \Delta$. Accordingly, there are $2^{l-k}P$ memory addresses covered by equation (11). Lemma 3.3 shows that equation (12) is a bijective function which maps the $\Delta \times 2^{l-k}$ addresses not covered by equation (11) into the remaining $\Delta \times 2^{l-k}$ locations of memory module B, the secondary stratum, without causing memory contention.

The proof of Theorem 3 can be readily constructed from the following lemmas in a manner parallel to that for M-type systems by one skilled in the art. Accordingly, a detailed discussion of the lemmas comprising the proof has been omitted and the lemmas are simply listed to guide one skilled in the art in construction of the proof.

Lemma 3.1: For all addresses mapped into memory module B, i.e., for all addresses A such that $A \equiv B$ (modulo P), 1. $\lfloor A/(P+\Delta) \rfloor = \lfloor (A+P)/(P+\Delta) \rfloor - 1$
   if $A \bmod 2^k \geq \Delta$;

2. $\lfloor A/(P+\Delta) \rfloor = \lfloor (A+P)/(P+\Delta) \rfloor$
   if $A \bmod 2^k < \Delta$.

Lemma 3.2 : All memory addresses mapped into memory module B are expressible in the form $A=(i \times P)+B$ wherein i is an integer in the range $0 \leq i \leq 2^l - 1$. There are exactly $\Delta \times 2^{l-k}$ addresses A such that $A \bmod 2^k < \Delta$.

Lemma 3.3 : For all memory addresses mapped into memory module B, i.e., for all $A=(i \times P)+B$ wherein $0 \leq i < 2^l$ such that $A \bmod 2^k < \Delta$ then equation (12) is bijective.

The second part of the description of this embodiment of the invention relates to a method and apparatus for the computation of equations (11) and (12) in O(1) gate delays and the computation of equation (13) in $O(\log_2 n)$ gate delays.

Equation (11) can be computed in O(1) gate delays since $(P+\Delta)$ is expressible as a power of two. The first term in equation (12) is a binary string of l bits with the first k bits equal to the bitwise complement of A mod $2^k$ followed by (l–k) zeros. The numerical value of the second term is less than $2^{l-k}$. Accordingly, equation (12) can be computed by filling the most significant k bits of L with the bitwise complement of the least significant k bits of A and filling the remaining (l–k) bits of L with the least significant (l–k) bits of $\lfloor A/(P+\Delta) \rfloor$. This computation can be accomplished in O(1) gate delays.

The method and apparatus disclosed in FIG. 3 for the computation of equations (3) and (4) is used without modification for the computation of equations (11) and (12) except that the sensor 34 now determines whether A mod $2^k \geq \Delta$ or not to control the multiplexer 35.

The computation of equation (13) is accomplished using a variation of the technique employed for equation (5). The address A is represented in terms of k-bit groups such that $$A = a_{m-1} Q^{m-1} + \ldots + a_1 Q + a_0,$$

wherein $Q = 2^k$, $m = \lceil n/k \rceil$, $0 \leq a_i \leq 2^k - 1$, for $0 \leq i \leq m-1$. Then, since $Q \equiv \Delta$ (modulo $(2^k - \Delta)$), the computation of the memory module index $B = A \bmod (2^k - \Delta)$ is equivalent to the computation of the expression $$\Delta^{m-1} a_{m-1} + \ldots + \Delta a_1 + a_0 (\text{modulo}(2^k - \Delta)).$$

This expression can be computed by employing the following addition convention. For any k-bit binary number a, the values for $a = 2^k - \Delta, \ldots, 2^k - 1$ are replaced by $a = 0, \ldots, (\Delta - 1)$ respectively, i.e., $$0 \leq a < 2^k, \quad a \equiv A \;(\text{modulo } (2^k - \Delta)).$$

Then the basic operation of addition mod $(2^k - \Delta)$ for any two numbers a and b is equivalent to the following addition operation:

$$a +' b = \begin{cases} a + b & \text{if } a + b < 2^k \\ ((a+b) \bmod 2^k) + \Delta & \text{if } a + b \geq 2^k \end{cases}$$

Hence A mod $(2^k - \Delta)$ is computed by adding the $\lceil n/k \rceil$ numbers, $$\Delta^{m-1} a_{m-1} +' \ldots +' \Delta a_1 +' a_0$$

using the addition operation defined above.

When $\Delta > 1$, the term $\Delta^i \times a_i$ for $0 \leq i \leq m$ is not necessarily identical to the k-bit binary number $a_i$. Accordingly, more than $\lceil n/k \rceil$ binary numbers must be compressed into two numbers using a Wallace tree. Alternatively, table look-up can be used to compute the term $\Delta^i \times a_i \bmod (2^k - \Delta)$ and then a Wallace tree can be used to compress the $\lceil n/k \rceil$ numbers into 2 numbers.

Therefore, according to the foregoing description of the embodiment of the present invention as it pertains to GM-Type prime-way interleaved memory systems, a method and apparatus are provided for the computation of equations (11) and (12) in O(1) gate delays and for the computation of equation (13) in O($\log_2 n$) gate delays.

GF-Type Prime-Way Interleaved Memory Systems

GF-type ($P = 2^k + \Delta$) memory systems are disclosed using a line of argument parallel to that for F-type memories. Furthermore, the F-type memory systems are a special case of GF-type memories wherein $\Delta = 1$. The disclosure comprises two parts.

For GF-type memories the following disclosure provides three equation (14), (15) and (16) which serve the identical purpose as equations (1) and (2) in mapping all of the P×W memory addresses into distinct locations of the GF-type prime-way interleaved memory system.

For any memory address A in the range $0 \leq A \leq (P \times W) - 1$, the following equations map A to location L of memory module B:

$$L = \lfloor A/(2(P-\Delta)) \rfloor \text{ if A mod } 2^{k+1} \geq (P - 2\Delta) \tag{14}$$

$$L = 2^{l-k-1}(2^{k+1} - 1 - (A \bmod 2^{k+1})) + (\lfloor A/(2(P-\Delta)) \rfloor) \bmod 2^{l-k-1}) \text{ if A mod } 2^{k+1} < (P - 2\Delta) \tag{15}$$

$$B = A \bmod P \tag{16}$$

The general validity of the method embodied in equations (14), (15) and (16) for all GF-type memory systems is demonstrated in the following theorem and proved thereafter.

THEOREM 4: The method embodied a in the use of equations (14), (15) and (16) maps all of the P×W addresses into distinct locations of a GF-type prime-way interleaved memory system.

The proof proceeds in a parallel manner to that for F-type memories. For all memory addresses mapped into memory module B, i.e., for all $A \equiv B$ (modulo P), the following steps demonstrate the theorem. Lemma 4.1 shows that equation (14) maps all those memory addresses such that A mod $2^{k+1} \geq (P - 2\Delta)$ into distinct locations of the contiguous set of locations in memory module B starting with location zero. Lemma 4.2 shows that there are exactly $(P - 2\Delta)2^{l-k-1}$ addresses A such that A mod $2(P-\Delta) < (P-2\Delta)$ and, thus, there are exactly $2^{l-k-1} P$ addresses covered by equation (14). Lemma 4.3 shows that equation (15) is a bijective function which maps the $2^{l-k}(P-2\Delta)$ addresses not covered by equation (14) into the remaining $2^{l-k-1}(P-2\Delta)$ locations of memory module B without causing memory contention.

The proof of Theorem 4 follows from the list of lemmas below in a manner analogous to that for F-type memories.

Lemma 4.1: For all addresses mapped into memory module B, i.e., for all addresses A such that $A \equiv B$ (modulo P), 1. $\lfloor A/2(P-\Delta) \rfloor = \lfloor (A+P)/2(P-\Delta) \rfloor - 1$ if A mod $2^{k+1} \geq (P-2\Delta)$;

2. $\lfloor A/(2(P-\Delta)) \rfloor = \lfloor (A+P)/2 (P-\Delta) \rfloor$, if A mod $2^{k+1} < (P-2\Delta)$.

Lemma 4.2: All memory addresses mapped into memory module B are expressible in the form $A = (i \times P) + B$ where i is an integer in the range $0 \leq i \leq 2^l - 1$ and there are exactly $(P-2\Delta)2^{l-k-1}$ addresses A such that A mod $2(P-\Delta) < (P-2\Delta)$.

Lemma 4.3: For all memory addresses mapped into memory module B, i.e., for all $A = (i \times P) + B$ wherein $0 \leq i \leq 2^l - 1$ such that A mod $2^{k+1} < (P-2\Delta)$ then equation (15) is a bijective mapping.

The second part of this description recites a method and apparatus for the computation of equations (14) and (15) in O(1) gate delays and the computation of equation (16) in O($\log_2 n$) gate delays.

Equation (14) can be computed in O(1) gate delays since $2(P-\Delta)$ is a power of 2. The numerical value of the first term in equation (15) is a binary string of l bits with the first k+1 bits equal to the bitwise complement of A mod $2^{k+1}$ followed by l–k–1 zeros. The value of the second term of this equation is less than $2^{l-k-1}$. Hence, the value of L generated by equation (15) can be computed by having the most significant k+1 bits of L filled with the bit-wise complement of the least significant k+1 bits of A and the remaining l–k–1 bits of L filled with the least significant l–k–1 bits of $\lfloor A/2(P-\Delta) \rfloor$. This computation can be accomplished in $O(1)$ gate delays.

The apparatus shown in FIG. 4 for the computation of equations (8) and (9) is used without modification for the computation of equations (14) and (15) except that now the sensor 44 determines whether $A \bmod 2^{k+1} \geq (P-2\Delta)$ or not to control the multiplexer 45.

The computation of equation (16) is accomplished using a variation of the technique employed for equation (8). The address A is expressed in terms of k-bit groups such that $$A = a_{m-1}Q^{m-1} + \ldots + a_1 Q + a_0$$

wherein $Q=2^k$, $m=\lceil n/k \rceil$, $0 \leq a_i < 2^k$, for i in the range $0 \leq i \leq m-1$. Then, since $Q \equiv -\Delta$ (modulo $(2^k+\Delta)$), the computation of the memory module index $B = A \bmod (2^k+\Delta)$ is equivalent to the computation of the expression $$a_{m-1}(-\Delta)^{m-1} + \ldots + a_1(-\Delta) + a_0 \pmod{2^k+\Delta}$$

The basic operations of addition and subtraction (modulo $(2^k+\Delta)$) for any two numbers a and b are equivalent to the following operations:

$$a +' b = \begin{cases} a+b & \text{if } a+b < 2^k + \Delta \\ ((a+b) \bmod 2^k) - \Delta & \text{if } a+b \geq 2^k + \Delta, \end{cases}$$

and $$a -' b = \begin{cases} a-b & \text{if } a-b \geq 0 \\ ((a-b) \bmod 2^k) + \Delta & \text{if } a-b < 0. \end{cases}$$

Hence the expression $A \bmod (2^k+\Delta)$ is computed by applying the two operations defined in the preceding to the $\lceil n/k \rceil$ numbers, $$a_{m-1}(-\Delta)^{m-1} +' \ldots +' a_1(-\Delta) +' a_0.$$

When $\Delta > 1$, the term $a_i(-\Delta)^i$ is not necessarily the same as the k-bit number $a_i$ itself. Accordingly, more than $\lceil n/k \rceil$ binary numbers must be compressed into two numbers using a Wallace tree. Alternatively, table look-up can be employed to compute the term $a_i(-\Delta)_i \bmod (2^k+\Delta)$ and then a Wallace tree can be used to compress the $\lceil n/k \rceil$ numbers into two (k+1)-bit numbers.

From the foregoing, it is clear that the method and apparatus of this embodiment provides for the computational of equations (14) and (15) in $O(1)$ gate delays and for the computation of equation (16) in $O(\log_2 n)$ gate delays.

II. FAMILY OF FUNCTIONS FOR ADDRESS MAPPING

The equations disclosed in this invention for the determination of the location index L are implicitly included in a large family of mappings which are algebraic rearrangements of the disclosed equations and which are, therefore, completely equivalent to the equations disclosed in this invention.

For the GM-type prime-way interleaved memory system, the location index is determined by equations (11) and (12). The determination of the location index L from the address A is obtained essentially by a logic operation rather than an arithmetic operation and is best represented in terms of bit manipulation.

The bit representation of A is $A_{n-1} \ldots A_0$ and of L is $L_{l-1} \ldots L_0$. The method for determining the location index L for the GM-type memory system disclosed herein generates L as a function of A as follows:

$$L = \begin{cases} A_{n-1} \ldots A_l A_{l-1} \ldots A_k & \text{if } A \bmod 2^k \geq \Delta \\ \overline{A_{k-1}} \ldots \overline{A_0} A_{l-1} \ldots A_k & \text{otherwise} \end{cases} \quad (17)$$

The set of equations (11) and (12) is an alternative representation of the function (17) in terms of ordinary algebraic manipulation. It was shown that function (17) is bijective for those addresses A whose remainder mod P is a fixed constant.

A family of such bijective functions exists all of which are equivalent to function (17) disclosed herein. Any one of the family can be employed to compute L from A with the same hardware and time complexities. The following gives a rule for constructing equivalent functions in the family:

1. a function whose output is $A_{n-1} \ldots A_1$ followed by a permutation of $A_{l-1} \ldots A_k$ with any bits complemented if A mod $2^k \geq \Delta$; otherwise whose output is the bitwise complement of $A_{k-1} \ldots A_0$ followed by a permutation of $A_{l-1} \ldots A_k$ with any bits complemented is a member of the family; and 2. a function whose output is a permutation of the l bits in the output of a member of the family with any bits complemented is also a member of the family.

Similarly, for the GF-type prime-way interleaved memory system the determination of the location index L is accomplished by equations (14) and (15). The determination of the location index L from the address A is obtained essentially by a logic operation rather than an arithmetic operation and is best represented in terms of a bit manipulation.

The bit representation of A is $A_{n-1} \ldots A_0$ and of L is $L_{l-1} \ldots L_0$. The method for determining the location index L for the GF-type memory system disclosed herein generates L as a function of A as follows:

$$L = \begin{cases} A_{n-1} \ldots A_l A_{l-1} \ldots A_{k+1} & \text{if } A \bmod 2^{k+1} \geq P-2\Delta \\ \overline{A_k} \ldots \overline{A_0} A_{l-1} \ldots A_{k+1} & \text{otherwise} \end{cases} \quad (18)$$

Similarly, the set of equations (14) and (15) is an alternative representation of the function (18) in terms of ordinary algebraic manipulation. It was shown that function (18) is bijective for those addresses A whose remainder mod P is a fixed constant.

A family of such bijective functions exists all of which are equivalent to function (18) disclosed herein. Any one in the family can be employed to determine L from A with the same hardware complexities. The following gives a rule for the construction of the equivalent functions in the family:

1. a function whose output is $A_{n-1} \ldots A_1$ followed by a permutation of $A_{l-1} \ldots A_{k+1}$ with any bits complemented if A mod $2^{k+1} \geq P-2\Delta$; otherwise whose output is the bitwise complement of $A_k \ldots A_0$ followed by a permutation of $A_{l-1} \ldots A_{k+1}$ with any bits complemented is a member of the family; and 2. a function whose output is a permutation of the l bits in the output of a member of the family with any bits complemented is also a member of the family.

III. GENERALIZATION OF PRIME-WAY INTERLEAVED MEMORY SYSTEMS

The methods disclosed herein have focused on prime-way interleaved memory systems in which each memory module consists of a single memory bank. The following generalizes these disclosures to prime-way interleaved memory systems in which each of the memory modules comprises $2^m$ memory banks where m is any integer. The memory banks within each memory module are indexed from 0 to $2^m-1$ and each memory bank contains $2^b$ locations. Such a P-way memory system has $P \times 2^l$ locations wherein $l=m+b$.

For any memory address A in the range $0 \leq A \leq (P \times 2^l)-1$, the memory system will map the address A to the location $$\lfloor L/2^m \rfloor \tag{19}$$

of memory bank L mod $2^m$ (20)

of memory module A mod P (21)

where L is a binary number of l bits generated from A by any function in the family of functions for the GM-type system if $P=2^k-\Delta$; and by any function in the family of functions for the GF-type system if $P=2^k+\Delta$. For example, function (17) can be used for $P=2^k-\Delta$; and function (18) can be used for $P=2^k+\Delta$.

THEOREM 5: The use of equations (19), (20), (21) together with function (17) or (18) will map the $P \times 2^l$ memory addresses into distinct locations of the generalized prime-way interleaved memory system.

The proof of Theorem 5 can be readily constructed by one familiar with the art.

IV. VECTOR ADDRESS GENERATION

The method described herein ensures full utilization of memory space in a memory system of the (P,K,M)-type. Memory access conflicts will never occur when the memory system serves only one request for a vector of data at any given time, provided the stride of the vector is not a multiple of P. It is apparent that memory access conflicts may still occur when multiple requests, each of which requests a vector of data, are served by the memory system concurrently. The following aspect of this disclosure provides a method for the minimization of memory access conflicts in (P,K,M)-type memory systems.

As mentioned earlier, a vector of data is typically specified by three parameters, namely, SA, S and VL for a vector of VL words with the monotonic memory address sequence $<SA, SA+S, \ldots, SA+(VL-1)S>$. One way for a memory port to access this vector is to access the words of the vector in the order in which their addresses appear in the monotonic memory address sequence specified above. In this case, accessing the words of the vector will request memory modules in the sequence $<SA \bmod P, (SA+S) \bmod P, \ldots, (SA+(VL-1)S) \bmod P>$ which is also denoted herein as $<SA, SA+S, \ldots, SA+(VL-1)S> \bmod P$. When $VL=P$ and S is not a multiple of P, the memory module sequence requested is a permutation of the sequence $<0, 1, \ldots, P-1>$ and the permutation is determined by the starting address SA and the stride S. The monotonic address sequence for the vector can be generated using the recurrence relation $A:=A+S$ wherein $A=SA$ is the first address in the sequence. The symbol $X:=E$ means to give the value of expression E to variable X.

The words of the vector can be accessed in an order different from the above. A sequence of P addresses for a vector of length $VL=P$ with starting address SA and stride S is denoted herein as an "optimized address sequence of the $\alpha$-type" for the vector, if accessing the words of the vector in the order in which their addresses appear in the optimized address sequence of the $\alpha$-type, requests the memory modules in the sequence $<SA, SA+\alpha, \ldots, SA+(P-1)\alpha> \bmod P$, wherein $\alpha$ is any integer such that $1 \leq \alpha \leq P-1$, regardless of the value of the stride S. Thus, an optimized address sequence of the $\alpha$-type references the memory modules in a sequence that is a permutation of the sequence $<0, 1, \ldots, P-1>$ and the permutation is determined only by the starting address SA and $\alpha$, and not by the value of the stride S.

Requesting memory modules in an optimized address sequence of the $\alpha$-type at each active memory port with the same fixed value of $\alpha$ for all memory ports minimizes memory access conflicts when the memory system serves multiple requests with each active memory port serving a single request for a vector of data. In such an arrangement each active memory port accesses the memory system as if the stride of the vector access of every port were equal to the value of the integer $\alpha$.

In the following a method is described for generation of the optimized address sequence of the $\alpha$-type for a vector of length P with starting address SA and stride S. Accordingly, for any integer s such that $0 \leq s \leq P-1$, let $I(\alpha)_s$ denote an integer in the range $1 \leq I(\alpha)_s \leq P-1$ such that $I(\alpha)_s \times s \equiv \alpha$ (modulo P). In the case when $s=0$, $I(\alpha)_s$ is defined to be 1.

THEOREM 6: For $S>0$ and $S \not\equiv 0$ (modulo P), let A belong to the set of integers $Q=\{SA+i\times S | 0 \leq i \leq P\}$ and $A \equiv F$ (modulo P). If $A+I\times S$ does not belong to Q, then $A-(P-I)S$ belongs to Q and $A-(P-I)S \equiv F+\alpha$ (modulo P), wherein $I=I(\alpha)_s$ and $s=S \bmod P$.

Proof: If A belongs to the set of integers Q then $A=SA+i\times S$ for some i in the range $0 \leq i \leq P$. If $A+I\times S$ does not belong to Q then it is implied that $A+I\times S>SA+P\times S$. It follows that $SA+2P\times S>SA+(i+I)S>SA+P\times S$ since $I<P$, hence $1 \leq i+I-P \leq P-1$. So $A+(I-P)S$ is a member of the set Q. Furthermore, $SA+(i+I-P)S \equiv F+\alpha \pmod{P}$.

It follows from Theorem 6 that procedure 1, which follows, will generate an optimized address sequence of the $\alpha$-type denoted by $<A_0, A_1, \ldots, A_{p-1}>$ for a vector of length P with starting address SA and stride S:

Procedure 1.

1.1 $A_0:=SA$, $I:=I(\alpha)_s$, where $s=S \bmod P$.

1.2 Do step 1.3 for $i=0, 1, \ldots, P-2$.

1.3 If $A_i+I\times S$ belongs to Q, $A_{i+1}:=A_i+I\times S$; otherwise, $A_{i+1}:=A_i-(P-I)\times S$.

In order to implement the above procedure more efficiently, a control device denoted as the "control vector" is introduced. A control vector of the form $CV(\alpha)_s$ is a pre-computed, bit vector of length P employed to facilitate the generation of the optimized address sequence of the $\alpha$-type for vectors of length P with an arbitrary starting address SA and such a stride S that $s=S \bmod P$. The ith bit of the control vector is denoted by the term $CV(\alpha)_s[i]$, where $0 \leq i \leq P-1$, and is used to indicate whether $A_i+I\times S$ belongs to Q or not, at the ith iteration of step 1.3 as follows: $CV(\alpha)_s[i]=1$ indicates that $A_i+I\times S$ belongs to Q, and $CV(\alpha)_s[i]=0$ indicates that $A_i+I\times S$ does not belong to Q. The use of the control vector $CV(\alpha)_s$ eliminates the need for testing the condition of membership in the set Q at step 1.3.

For fixed values of P and $\alpha$, it is sufficient to have a set of P control vectors $CV(\alpha)$ defined such that $CV(\alpha)= \{CV(\alpha)_s | 0 \leq s \leq P-1\}$ for generating the optimized address sequence of the $\alpha$-type for vectors with arbitrary starting addresses and strides. $CV(\alpha)_0$ is required for vectors whose strides are multiples of P. Procedure 2, which follows, constructs the control vectors $CV(\alpha)_s$ in the set $CV(\alpha)$ for any given value of s, where $0 \leq s \leq P-1$. Herein Q is the set of integers $\{i\times s | 0 \leq i \leq P\}$ and $I=I(\alpha)_s$.

Procedure 2.

2.1 A:=0.

2.2 Do step 2.3 for i=0, 1, . . . , P−1.

2.3 If A+Ixs belongs to Q, $CV(\alpha)_s[i]:=1$, and A:=A+Ixs; otherwise, $CV(\alpha)_s[i]:=0$, and A:=A−(P−I)×s.

Example 1. Application of the procedure above for P=7 and $\alpha=1$ generates the following set of 7 control vectors CV(1), where $CV(1)_0=1\ 1\ 1\ 1\ 1\ 1\ 1$;

$CV(1)_1=1\ 1\ 1\ 1\ 1\ 1\ 1$;

$CV(1)_2=1\ 0\ 1\ 0\ 1\ 0\ 1$;

$CV(1)_3=1\ 0\ 0\ 1\ 0\ 0\ 1$;

$CV(1)_4=1\ 1\ 0\ 1\ 1\ 1$;

$CV(1)_5=1\ 1\ 0\ 1\ 0\ 1\ 1$;

$CV(1)_6=1\ 0\ 0\ 0\ 0\ 0\ 1$.

For fixed P and $\alpha$, the set of P control vectors $CV(\alpha)$ can be implemented by a combinatorial circuit with O(P) logic gates and each control vector $CV(\alpha)_s$ can be generated as a function of s in O(1) gate delays. The following two properties can be used to further simplify the combinatorial circuit for implementation of the set of control vectors $CV(\alpha)$:

1. For any control vector $CV(\alpha)_s$, $CV(\alpha)_s[i]=CV(\alpha)_s[P−i−1]$, where $0 \leq i \leq (P−1)/2$.

2. For $1 \leq s \leq (P−1)/2$, $CV(\alpha)_s[i]$ and $CV(\alpha)_{P−s}[i]$ are complement of each other, where $1 \leq i \leq P−2$.

For a given value of stride S, the procedure which follows from Theorem 6 also makes use of $I(\alpha)_s$ and $P−I(\alpha)_s$, where s=S mod P. For fixed values of P and $\alpha$, it is sufficient to have a set of integers $I(\alpha)=\{I(\alpha)_s | 0 \leq s \leq P−1\}$ and a set of integers $I'(\alpha)=\{P−I(\alpha)_s | 0 \leq s \leq P−1\}$ for handling vectors with arbitrary strides. $I(\alpha)_0$ is needed for vectors whose strides are multiples of P. The two sets contain the same collection of integers. The set of P integers can be implemented by a combinatorial circuit with $O(\log_2 P)$ logic gates and each $I(\alpha)_s$ and $P−I(\alpha)_s$ in the set can be generated as a function of s in O(1) gate delays.

Example 2. The following are the set $I(\alpha)$ and the set $I'(\alpha)$ for P=7 and $\alpha=1$:

$I(1)=\{I(1)_0=1,I(1)_1=1,I(1)_2=4,I(1)_3=5, I(1)_4=2,I(1)_5=3,I(1)_6=6\}$;

and $I'(1)=\{I'(1)_0=6,I'(1)_1=6,I'(1)_2=3,I'(1)_3=2, I'(1)_4=5,I'(1)_5=4,I'(1)_6=1\}$.

Now that the set of control vectors $CV(\alpha)$ and the sets of integers $I(\alpha)$ and $I'(\alpha)$ are available, the optimized address sequence of the $\alpha$-type, $<A_0, A_1, \ldots, A_{P-1}>$, for a vector of length P with starting address SA and stride S is generated as follows, using procedure 3:

Procedure 3.

3.1 $A_0:=SA$, s:=S mod P, $R1:=I(\alpha)_s \times S$, $R0:=(P−I(\alpha)_s) \times S$.

3.2 Do step 3.3 for i=0, 1, . . . , P−2.

3.3 If $CV(\alpha)_s[i]=1$, $A_{i+1}:=A_i+R1$; otherwise, $A_{i+1}:=A_i−R0$.

Example 3. For P=7, a vector of length P=7 (comprised of 7 words) with a starting address SA=100 and stride S=16 has the monotonic sequence of addresses <100, 116, 132, 148, 164, 180, 196> for its words. The monotonic address sequence will reference the 7 memory modules in the sequence <2, 4, 6, 1, 3, 5, 0>.

Application of procedure 3 generates an optimized address sequence of the l-type for the vector as follows:

Since s=2 (i.e., since s=16 mod 7), $I(1)_2 \times S =4 \times 16=64$, $(P−I(1)_2) \times S=3 \times 16=48$ and $CV(1)_2=10\ 10101$. Therefore, based on the control vector $CV(1)_2$, the optimized address sequence of the l-type for the vector generated by the procedure is <100, 100+64, 164−48, 116+64, 180−48, 132+64, 196−48>, i.e., <100, 164, 116, 180, 132, 196, 148>, which will reference the 7 memory modules in the sequence <2, 3, 4, 5, 6, 0, 1>.

Figure 5:
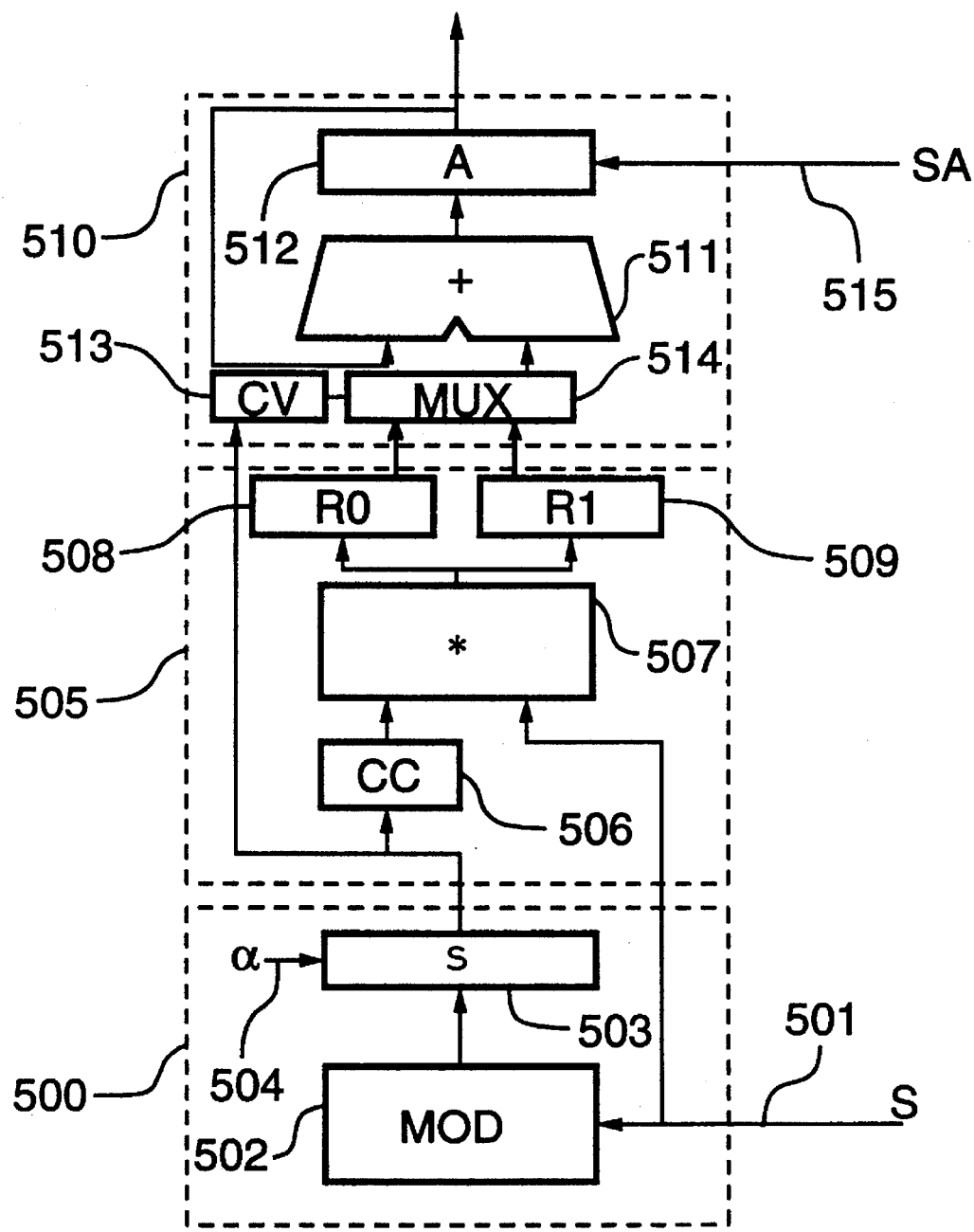
FIG. 5 depicts in schematic form and for purposes of illustration a three stage pipeline for executing procedures 3 and 4 disclosed herein for generation of memory addresses in optimized address sequence of the α-type.

While the operations for generating an optimized address sequence of the $\alpha$-type are presented in a sequential manner in Procedure 3 for illustration, actual implementations require overlapping of the operations for computational efficiency. FIG. 5, illustrates in schematic form a possible three stage pipelined hardware implementation of this procedure. As shown in FIG. 5, Stage 1 500 comprises an unit denoted by MOD 502 for computing S mod P and a register s 503 for storing the result or the value of $\alpha$ 504, where S 501 is the stride of the vector. Stage 2 505 comprises a combinatorial circuit CC 506 for generating $I(\alpha)_s$ and $P−I(\alpha)_s$ as a function of s, a multiplier 507, and two registers R0 508 and R1 509 for storing $I(\alpha)_s \times S$ and $(P−I(\alpha)_s) \times S$, respectively. Stage 3 510 comprises an adder 511, a register A 512 for storing the starting address SA 515 initially, and for storing the output of the adder 511 afterwards, a combinatorial circuit CV 513 for generating $CV(\alpha)_s$ as a function of s, a multiplexor MUX 514 for connecting one of registers R1 509 and R0 508 to the adder 511 under the control of the control vector $CV(\alpha)_s$. The adder 511 then performs either A+R1 or A−R0 accordingly.

A reservation table for the three stage address generation pipeline is shown in FIG. 6. Each row in the reservation table corresponds to the time usage of a unique stage in the pipeline. Each column corresponds to the internal usage of the pipeline at a particular interval of time. The symbol "x" in the (i,j) entry of the reservation table signifies that stage i is needed in the computation j units of time after the initiation of the pipeline.

During operation of the pipeline, Stage 1 500 computes S mod P and stores the result in register s 503 at time 0. Stage 2 505 computes $I(\alpha)_s \times S$ and stores the result in register R1 509 at time 1. It then computes $(P−I(\alpha)_s) \times S$ and stores the result in register R0 508 at time 2. Stage 3 510 loads register A 512 with the starting address SA 515 at time 1, and will then be used for P−1 successive time units to generate the remaining P−1 addresses, one address per time unit. At time t, $2 \leq t \leq P$, the multiplexor MUX 514 connects either R0 508 or R1 509 to the adder 511, depending upon whether bit i of $CV(\alpha)_s$ is 0 or 1, where i=t−2, and register A 512 is loaded with the corresponding output of the adder 511. Note that bit 0 of $CV(\alpha)_s$ is always 1, so R0 508 will not be used before it is loaded at time 2. Thus, after initiation of the pipeline at time 0, it will start producing memory addresses in optimized address sequence of the $\alpha$-type $<A_0, A_1, \ldots, A_{P-1}>$ in P time units with $A_i$ available in register A 512 at time i+1.

The remaining part of this disclosure deals with vector address generation for a vector V of length VL with starting address SA and stride S, where VL is an arbitrary integer not necessarily equal to P.

We denote a sequence of memory addresses for the words of the vector V an optimized address sequence of the $\alpha$-type for the vector, if accessing the words of the vector in the order in which their addresses appears in the address sequence requests the P memory modules in a sequence that is comprised of $\lfloor VL/P \rfloor$ cycles of the sequence $<SA, SA+\alpha, \ldots, SA+(P−1) \times \alpha>$ mod P followed by a shorter sequence $\langle SA, SA+S, \ldots, SA+((VL \bmod P)-1)\times S\rangle \bmod P$. This optimized address sequence of the $\alpha$-type for V is denoted by $\langle A_0, A_1, \ldots, A_{VL-1}\rangle$.

In the following, a method is described for the generation of the sequence $\langle A_0, A_1, \ldots, A_{VL-1}\rangle$. For illustrative purposes only, the vector V is divided into $\lfloor VL/P\rfloor$ subvectors each of length P and a shorter subvector of length VL mod P. The starting address of the kth subvector, $V_k$, is $SA+k\times P\times S$ for $0\leq k\leq\lfloor VL/P\rfloor$, and all subvectors have the same stride S. Without loss of generality, we allow $V_{\lfloor VL/P\rfloor}$ to be the shorter subvector.

It follows that accessing words of the subvector $V_k$ in the optimized address sequence of the $\alpha$-type for the subvector will request the memory modules in the sequence $\langle SA, SA+\alpha, \ldots, SA+(P-1)\times\alpha\rangle \bmod P$, where $0\leq k\leq\lfloor VL/P\rfloor -1$. Accessing words of the shorter subvector in the monotonic address sequence for that subvector will request the memory modules in the sequence $\langle SA, SA+S, \ldots, SA+((VL \bmod P)-1)\times S\rangle \bmod P$. Thus, the sequence $\langle A_0, A_1, \ldots, A_{VL-1}\rangle$ can be obtained by cascading the optimized address sequences of the $\alpha$-type for $V_0, V_1, \ldots, V_{\lfloor VL/P\rfloor-1}$, and the monotonic address sequence for the shorter subvector.

Furthermore, note that when step 3.3 of procedure 3 is allowed to iterate P times, the first P−1 iterations will generate $A_1, A_2, \ldots, A_{P-1}$ and the last iteration will generate $A_P$. It follows from Theorem 6 and the construction of the control vector $CV(\alpha)_s$ that $A_P=SA+P\times S$, which is the starting address of the next subvector. This leads to the following procedure to generate the sequence $\langle A_0, A_1, \ldots, A_{VL-1}\rangle$.

Procedure 4.

4.1 $A_0:=SA$, $s:=S \bmod P$, $R1:=I(\alpha)_s\times S$, $R0:=(P-I(\alpha)_s)\times S$.

4.2 Do step 4.3 for $i=0, 1, \ldots, VL-(VL \bmod P)-1$.

4.3 If $CV(\alpha)_s[i \bmod P]=1$, $A_{i+1}:=A_i+R1$; otherwise, $A_{i+1}:=A_i-R0$.

4.4 Do step 4.5 for $i=VL-(VL \bmod P), \ldots, VL-2$.

4.5 $A_{i+1}:=A_i+S$.

With $A_0=SA$, the first P iterations of step 4.3 generate $A_1, \ldots, A_{P-1}$, and $A_P$. While $\langle A_0, A_1, \ldots, A_{P-1}\rangle$ is the optimized address sequence of the $\alpha$-type for $V_0$, $A_P=SA+P\times S$ is the starting address of $V_1$. The subsequent P iterations of step 4.3 generate $A_{P+1}, \ldots, A_{2P-1}$, and $A_{2P}$. Now, $\langle A_P, \ldots, A_{2P-1}\rangle$ is the optimized address sequence of the $\alpha$-type for $V_1$, and $A_{2P}=SA+2\times P\times S$ is the starting address of $V_2$, and so on. The very last iteration of step 4.3 generates $A_{VL-(VL \bmod P)}$, which is the starting address of the shorter subvector. The remainder of the monotonic address sequence for the shorter vector is generated through (VL mod P)−1 iterations of step 4.5.

The reservation table in FIG. 7 for the three stage pipeline of FIG. 5 illustrates a possible pipelined implementation of procedure 4, where $d=VL-(VL \bmod P)$.

During operation, Stage 1 500 stores the result of S mod P in register s 503 at time 0, and then stores the value of $\alpha$ in register s 503 at time d. Stage 2 505 first computes $I(\alpha)_s\times S$ and stores the result in register R1 509 at time 1, and then computes $(P-I(\alpha)_s)\times S$ and stores the result in register R0 at time 2. Stage 2 will repeat the same operations at time d+1 and time d+2. Thus registers R1 509 and R0 508 will be loaded with S and P−S at time d +1 and d+2, respectively, as register s 503 will contain the value of $\alpha$ at time d and $I(\alpha)_\alpha=1$. Note that $CV(\alpha)_\alpha$ is a control vector of P 1's. When it is used by stage 3 510 from time d+2 to time VL, only register R1 will be connected to the adder by the multiplexor MUX 514. Stage 3 510 loads register A 512 with the starting address SA at time 1, and it will then be used for VL−1 successive time units to generate the remaining VL−1 addresses, one address per time unit. Thus, after initiation of the pipeline at time 0, it will start producing the optimized address sequence of the $\alpha$-type $\langle A_0, A_1, \ldots, A_{VL-1}\rangle$ in VL time units with $A_i$ available in register A at time i+1.

Up to now it has been assumed that the value of stride S of a vector is a positive integer. The following theorem which is the counterpart of theorem 6 deals with negative value of S.

THEOREM 7: For $S<0$ and $S\neq 0$ (modulo P), let A belong to the set of integers $Q=\{SA+i\times S|0\leq i\leq P\}$ and $A\equiv F$ (modulo P). If $A+I\times S$ does not belong to Q, then $A-(P-I)S$ belongs to Q and $A-(P-I)S\equiv F-\alpha$ (modulo P) wherein $I=I(\alpha)_s$ and $s=|S| \bmod P$.

Proof: If A belongs to the set of integers Q then $A=SA+i\times S$ for some i in the range $0\leq i\leq P$. If $A+I\times S$ does not belong to Q then it is implied that $A+I\times S<SA+P\times S$. It follows that $SA+2P\times S<SA+(i+I)S<SA+P\times S$ since $I<P$, hence $1\leq i+I-P\leq P-1$. So $A+(I-P)S$ is a member of the set Q. Furthermore, $SA+(i+I-P)S\equiv F-\alpha$ (modulo P).

Consequently, using $s:=|S| \bmod P$ in place of $s:=S \bmod P$ at step 4.1 of procedure 4, the procedure will generate an address sequence $\langle A_0, A_1, \ldots, A_{VL-1}\rangle$ for a vector of VL words with starting address SA and a negative stride S. This address sequence will reference the P memory modules in such a sequence that is composed of $\lfloor VL/P\rfloor$ cycles of the sequence $\langle SA, SA-\alpha, \ldots, SA-(P-1)\times\alpha\rangle \bmod P$ followed by a shorter sequence $\langle SA, SA+S, \ldots, SA+((VL \bmod P)-1)\times S\rangle \bmod P$, which is an optimized address sequence of the $\alpha$-type for the vector with a negative value of stride S.

Example 4. For P=7, a vector of length P=7 with a starting address SA=196 and a stride S=−16 has the monotonic sequence of addresses $\langle 196, 180, 164, 148, 132, 116, 100\rangle$ for its words. The monotonic address sequence will reference the 7 memory modules in the sequence $\langle 0, 5, 3, 1, 6, 4, 2\rangle$.

Application of procedure 4 with $s:=|S| \bmod P$ generates an optimized address sequence of the 1-type for the vector as follows:

Since $s=2$ (i.e., since $s=|-16| \bmod 7$), $I(1)_2\times S=4\times -16=-64$, $(P-I(1)_2)\times S=3\times -16=-48$ and $CV(1)_2=1010101$. Therefore, based on the control vector $CV(1)_2$, the optimized address sequence of the 1-type for the vector generated by the procedure is $\langle 196, 196-64, 132+48, 180-64, 116+48, 164-64, 100+48\rangle$, i.e., $\langle 196, 132, 180, 116, 164, 100, 148\rangle$, which will reference the 7 memory modules in the sequence $\langle 0, 6, 5, 4, 3, 2, 1\rangle$.

Finally, we consider the generation of memory module indices in response to an optimized address sequence of the $\alpha$-type for a vector of length VL with starting address SA and stride S.

One way of doing it is to apply a mod P operation on each memory address in the optimized address sequence to obtain the corresponding memory module index, one at a time, as soon as the memory address is generated.

In the following we give an alternative procedure for generating memory module indices. Without loss of generality, let S be a positive integer. The following procedure generates memory module indices in a sequence $\langle B_0, B_1, \ldots, B_{VL-1}\rangle$ such that $B_i=A_i \bmod P$.

Procedure 5.

5.1 $B_0:=SA \bmod P$, $s:=S \bmod P$.

5.2 Do step 5.3 for $i=0, 1, \ldots, VL-(VL \bmod P)-1$.

5.3 $B_{i+1}:=(B_i+\alpha) \bmod P$.

5.4 Do step 5.5 for $i=VL-(VL \bmod P), \ldots, VL-2$.

5.5 $B_{i+1}:=(B_i+\alpha) \bmod P$.

It is apparent the above procedure can be executed in parallel with procedure 4 by means of two pipeline to generate memory module indices as well as memory addresses in optimized address sequence of the α-type for the vector concurrently.

SYMBOLS AND NOTATIONAL CONVENTIONS

The following symbols and notational conventions are used in this document:

$\log_2 x$—logarithm to the base 2 of x.

$\lfloor x \rfloor$—the greatest integer less than or equal to the number x.

$\lceil x \rceil$—the smallest integer greater than or equal to the number x.

mod K—mod K arithmetic, and A mod K is the remainder upon division of integer A by integer K.

$A \equiv B$ (modulo K) is an equivalence relation which means that when the integers A and B are divided by the integer K the same remainder is obtained.

$f(n)=O(g(n))$ means that there exists a constant c such that $f(n) \leq c(g(n))$ for all n in some finite set of non-negative values of n.

I claim:

1. In a prime-way interleaved memory system for use in a computing system which requests access of one or more vectors of data, comprising:

a) a prime number P of memory modules arranged into K sections, wherein $P=2^k \pm \Delta$ and wherein k and $\Delta$ are any integers;

b) $2^m$ memory banks in each of said memory modules, each of said memory banks being indexed from 0 to $2^{m-1}$, wherein m is any integer $\geq 0$, each one of said memory banks having $2^{l-m}$ memory locations, for a total of $P(2^l)$ memory locations in said memory system, wherein l is any integer $\geq m$, each of said memory locations being capable of storing a single datum or word, each of said $P(2^l)$ memory locations being identified by a memory address of the form $A=A_{n-1} \ldots A_0$, wherein $n=l+k$ when $P=2^k-\Delta$ and $n=l+k+1$ when $P=2^k+\Delta$;

c) a plurality of memory ports for access by said computing system;

d) switching means for connecting one of said memory ports to one of said memory banks within one of said memory modules within one of said sections in response to access to said memory location A of said one of said memory banks;

THE IMPROVEMENT COMPRISING e) index generating means associated with each of said plurality of memory ports for generating a set of indices for locating a unique memory location $\lfloor L/2^m \rfloor$ of a unique memory bank L mod $2^m$ of a unique memory module A mod P of a unique Section (A mod P) mod K, as a function of said memory address A to be accessed, wherein L is in the form of an l-bit binary string $L=L_{l-1} \ldots L_0$.

2. The memory system of claim 1, wherein $P=2^k-\Delta$ and said index generating means' generates said l-bit binary string L according to any one of a family of bijective mappings equivalent to $$L = \begin{cases} A_{n-1} \ldots A_l A_{l-1} \ldots A_k & \text{if } A \bmod 2^k \geq \Delta \\ \overline{A_{k-1}} \ldots \overline{A_0} A_{l-1} \ldots A_k & \text{otherwise.} \end{cases}$$

3. The memory system of claim 2, wherein said index generating means further comprises:

i) means for partitioning said address A into a first segment of k bits, a second segment of (l–k) bits and a third segment of k bits such that the first k-bit segment comprises the address bits $A_{n-1} \ldots A_l$, the second (l–k)-bit segment comprises the address bits $A_{l-1} \ldots A_k$ and the third k-bit segment comprises the address bits $A_{l-1} \ldots A_0$;

ii) sensor means for detecting whether $A \bmod 2^k < \Delta$ is true;

iii) means for concatenating said first k-bit segment with said second (l–k) bit segment in the event $A \bmod 2^k < \Delta$ is not true, thereby generating said l-bit binary string L of the form $A_{n-1} \ldots A_l A_{l-1} \ldots A_k$; and iv) means for concatenating the bitwise complement of said third k-bit segment with said second (l–k) bit segment in the event $A \bmod 2^k < \Delta$ is true, thereby generating said l-bit binary string L of the form $\overline{A_{k-1}} \ldots \overline{A_0} A_{l-1} \ldots A_k$.

4. The memory system of claim 1, wherein $P=2^k+\Delta$ and said index generating means generates said l-bit binary string L according to any one of a family of bijective mappings equivalent to $$L = \begin{cases} A_{n-1} \ldots A_l A_{l-1} \ldots A_{k+1} & \text{if } A \bmod 2^{k+1} \geq P - 2\Delta \\ \overline{A_k} \ldots \overline{A_0} A_{l-1} \ldots A_{k+1} & \text{otherwise.} \end{cases}$$

5. The memory system of claim 4, wherein said index generating means further comprises:

i) means for partitioning said address A into a first segment of k+1 bits, a second segment of (l–k–1) bits and a third segment of k+1 bits such that the first (k+1)-bit segment comprises the address bits $A_{n-1} \ldots A_1$, the second (l–k–1)-bit segment comprises the address bits $A_{l-1} \ldots A_{k+1}$ and the third (k+1)-bit segment comprises the address bits $A_k \ldots A_0$;

ii) sensor means for detecting whether $A \bmod 2^{k+1} < P-2\Delta$ is true;

iii) means for concatenating said first (k+1)-bit segment with said second (l–k–1)-bit segment in the event A mod $2^{k+1}<P-2\Delta$ is not true, thereby generating said l-bit binary string L of the form $A_{n-1} \ldots A_1, A_{l-1} \ldots A_{k+1}$; and iv) means for concatenating the bitwise complement of said third (k+1)-bit segment with said second (l–k–1)-bit segment in the event A mod $2^{k+1}<P-2\Delta$ is true, thereby generating said l-bit binary string L of the form $\overline{A_k} \ldots \overline{A_0} A_{l-1} \ldots A_{k+1}$.

6. In a prime-way interleaved memory system comprising:

a) a prime number P of memory modules, wherein $P=2^k-\Delta$ and wherein k and $\Delta$ are any integers;

b) $2^m$ memory banks in each of said memory modules, each of said memory banks being indexed from 0 to $2^{m-1}$, wherein m is any integer $\geq 0$;

c) $2^{l-m}$ memory locations in each of said memory banks, for a total of $P(2^l)$ memory locations in said memory system, wherein l is any integer $\geq m$, each of said memory locations being capable of storing a single datum or word, and each of said $P(2^l)$ memory locations being identified by a memory address A in the form of an n-bit binary string $A=A_{n-1}\ldots A_0$, wherein $n=l+k$;

THE IMPROVEMENT COMPRISING d) means for mapping each said memory address A to a unique location $\lfloor L/2^m \rfloor$ of a unique memory bank L mod $2^m$ of a unique memory module A mod P; wherein L is generated as a function of A according to any one of a family of bijective mappings equivalent to $$L = \begin{cases} A_{n-1}\ldots A_l A_{l-1}\ldots A_k & \text{if } A \mod 2^k \geq \Delta \\ \overline{A_{k-1}}\ldots \overline{A_0} A_{l-1}\ldots A_k & \text{otherwise.} \end{cases}$$

7. In a prime-way interleaved memory system comprising:

a) a prime number P of memory modules, wherein $P=2^k+\Delta$ and wherein k and $\Delta$ are any integers;

b) $2^m$ memory banks in each of said memory modules, each of said memory banks being indexed from 0 to $2^m-1$, wherein m is any integer $\geq 0$;

c) $2^{l-m}$ memory locations in each of said memory banks, for a total of $P(2^l)$ memory locations in said memory system, wherein l is any integer $\geq m$, each of said memory locations being capable of storing a single datum or word, and each of said $P(2^l)$ memory locations being identified by a memory address A in the form of an n-bit binary string $A=A_{n-1}\ldots A_0$, wherein $n=l+k+1$;

THE IMPROVEMENT COMPRISING d) means for mapping each said memory address A to a unique location $\lfloor L/2^m \rfloor$ of a unique memory bank L mod $2^m$ of a unique memory module A mod P; wherein L is generated as a function of A according to any one of a family of bijective mappings equivalent to $$L = \begin{cases} A_{n-1}\ldots A_l A_{l-1}\ldots A_{k+1} & \text{if } A \mod 2^{k+1} \geq P-2\Delta \\ \overline{A_k}\ldots \overline{A_0} A_{l-1}\ldots A_{k+1} & \text{otherwise.} \end{cases}$$

8. A method for minimizing memory access conflicts among concurrent access of multiple vectors to a multi-port interleaved memory system having a prime number P of memory modules, comprising the steps of:

a) generating memory addresses $A_0, A_1, \ldots A_{VL-1}$ for a vector of length VL with a starting address SA and a stride S in an optimized address sequence of the $\alpha$-type at each memory port, where a is an integer in the range from 1 to P−1 and is fixed for all memory ports of said memory system, and b) ordering each memory port to access words of said vector in the order in which their addresses appear in said optimized address sequence of the $\alpha$-type.

9. The method of claim 8, wherein said step of generating memory addresses $A_0, A_1, \ldots, A_{VL-1}$ in said optimized address sequence of the $\alpha$-type for said vector comprises executing the steps of:

a) setting $A_0:=SA$;

b) computing $s:=|S| \mod P$;

c) obtaining $I(\alpha)$, from a set $I(\alpha)$, wherein $I(\alpha)$ is a set of P precomputed integers $I(\alpha)=\{I(\alpha)_s|0 \leq s \leq P-1\}$ where $I(\alpha)_s$ is an integer in the range from 1 to P−1 such that $I(\alpha)_s \times s = \alpha \pmod{P}$ and $I(\alpha)_s=1$ if $s=0$;

d) obtaining CV ($\alpha$) from a set CV ($\alpha$), wherein CV ($\alpha$) is a set of P precomputed control vectors CV($\alpha$)= $\{CV(\alpha)_s|0 \leq s \leq P-1\}$ where $CV(\alpha)s$ is a control vector of P bits indexed from 0 to P−1;

e) setting $R1:=I(\alpha)_s \times S$;

f) setting $R0:=(P-i(\alpha)_s) \times S$;

g) generating $A_{i+1}$ for $i=0, 1, \ldots, VL-(VL \mod P)-1$ by i) setting $A_{i+1}:=A_i+R1$ if bit ($i \mod P$) of $CV(\alpha)_s$ is 1;

ii) setting $A_{i+1}:=A_i-R0$ if bit ($i \mod P$) of $CV(\alpha)_s$ is 0;

h) generating $A_{i+1}$ for $i=VL-(VL \mod P), \ldots, VL-2$ by setting $A_{i+1}:=Ai+S$.

10. A method for constructing the set of P precomputed control vectors $CV(\alpha)$ as set forth in claim 9 including a procedure, which uses the set of integers I ($\alpha$) as set forth in claim 9, to construct control vector $CV(\alpha)_s$, in said set for any given s in the range from 1 to P−1, comprising the steps of:

a) initializing a variable A to 0;

b) computing bit i of $CV(\alpha)_s$ for $i=0, 1, \ldots P-1$ by executing i) if $A \leq (P-I(\alpha)_s) \times s$, setting bit i of $CV(\alpha)_s$ to 1 and replacing A by $A+I(\alpha)_s \times s$ ii) if $A > (P-I(\alpha)_s) \times s$, setting bit i of $CV(\alpha)_s$ to 0 and replacing A by $A-(P-I(\alpha)_s) \times s$.

11. A method for minimizing memory access conflicts among concurrent access of multiple vectors to a multi-port interleaved memory system having a prime number P of memory modules, comprising the steps of:

a) generating memory addresses $A_0, A_1, \ldots, A_{VL-1}$ for a vector of length VL with a starting address SA and a stride S in an optimized address sequence of the $\alpha$-type at each memory port, where $\alpha$ is an integer in the range from 1 to P−1 and is fixed for all memory ports of said memory system by i) setting $A_0:=SA$;

ii) computing $s:=|S| \mod P$;

iii) obtaining $I(\alpha)$, from a set $I(\alpha)$, wherein $I(\alpha)$ is a set of P precomputed integers $I(\alpha)=\{I(\alpha)_s|0 \leq s \leq P-1\}$ where $I(\alpha)_s$ is an integer in the range from 1 to P−1 such that $I(\alpha)_s \times s = \alpha$ (modulo P) and $I(\alpha)_s=1$ if $s=0$;

iv) obtaining CV ($\alpha$) from a set CV ($\alpha$), wherein CV ($\alpha$) is a set of P precomputed control vectors CV($\alpha$)= $\{CV(\alpha)_s|0 \leq s \leq P-1\}$ where $CV(\alpha)_s$ is a control vector of P bits indexed from 0 to P−1;

v) setting $R1:=I(\alpha)_s \times S$;

vi) setting $R0:=(P-i(\alpha)_s) \times S$;

vii) generating $A_{i+1}$ for $i=0, 1, \ldots, VL-(VL \mod P)-1$ by vii-a) setting $A_{i+1}:=A_i+R1$ if bit ($i \mod P$) of $CV(\alpha)_s$ is 1;

vii-b) setting $A_{i+1}:=A_i-R0$ if bit ($i \mod P$) of $CV(\alpha)_s$ is 0;

viii) generating $A_{i+1}$ for $i=VL-(VL \mod P), \ldots, VL-2$ by setting $A_{i+1}:=Ai+S$; and b) ordering each memory port to access words of said vector in the order in which their addresses appear in said optimized address sequence of the $\alpha$-type.

12. A method for constructing the set of P precomputed control vectors $CV(\alpha)$ as set forth in claim 11 including a procedure, which uses the set of integers I ($\alpha$) as set forth in claim 11, to construct control vector $CV(\alpha)_s$, in said set for any given s in the range from 1 to P−1, comprising the steps of:

a) initializing a variable A to 0;

b) computing bit i of $CV(\alpha)_s$ for $i=0, 1, \ldots P-1$ by executing i) if $A \leq (P-I(\alpha)_s) \times s$, setting bit i of $CV(\alpha)_s$ to 1 and replacing A by $A+I(\alpha)_s \times s$ ii) if $A > (P-I(\alpha)_s) \times s$, setting bit i of $CV(\alpha)_s$ to 0 and replacing A by $A-(P-I(\alpha)_s) \times s$.

* * * * *